United States Patent
Wilz, Sr. et al.

(10) Patent No.: US 6,328,211 B1
(45) Date of Patent: Dec. 11, 2001

(54) AUTOMATIC HAND-SUPPORTABLE LASER BAR CODE SYMBOL SCANNER AND METHOD OF READING BAR CODE SYMBOLS USING THE SAME

(75) Inventors: David M. Wilz, Sr., Sewell; George B. Rockstein, Audubon; Carl H. Knowles, Moorestown, all of NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 08/899,977

(22) Filed: Jul. 24, 1997

Related U.S. Application Data

(63) Continuation of application No. 08/662,857, filed on Jun. 12, 1996, now abandoned, which is a continuation of application No. 08/532,261, filed on Sep. 22, 1995, now abandoned, which is a continuation of application No. 08/375,068, filed on Jan. 19, 1995, now abandoned, which is a continuation of application No. 08/150,637, filed on Nov. 8, 1993, now abandoned, which is a continuation-in-part of application No. 07/583,421, filed on Sep. 17, 1990, now Pat. No. 5,260,553.

(51) Int. Cl.$^7$ ........................................................ G06K 7/10
(52) U.S. Cl. ................................ 235/462.01; 235/462.3; 235/462.31; 235/462.45; 235/472.01
(58) Field of Search ........................ 235/462.01, 462.3, 235/462.31, 462.45, 472.01

(56) References Cited

U.S. PATENT DOCUMENTS

| | | |
|---|---|---|
| D. 305,885 | 2/1990 | Barkan et al. . |
| D. 307,894 | 5/1990 | Siemiatkowski . |
| 3,911,270 | 10/1975 | Traub . |
| 3,978,317 | 8/1976 | Yamaguchi et al. . |

(List continued on next page.)

FOREIGN PATENT DOCUMENTS

| | | |
|---|---|---|
| 0424097 | 4/1991 | (EP) . |
| 0424976 | 5/1991 | (EP) . |

OTHER PUBLICATIONS

R.T. Cato, "Hand–Held Holographic Scanner Having Highly Visible Locator Beam", IBM Technical Disclosure Bulletin, vol. 27, No. 4A, Sep. 1994.

Product Brochure and Schematic Diagram entitled "Metrologic SS–200 Magazine Scanner", Circa 1979.

(List continued on next page.)

Primary Examiner—Harold I. Pitts
(74) Attorney, Agent, or Firm—Hopgood, Calimafde, Judlowe & Mondolino, LLP

(57) ABSTRACT

An automatic bar code symbol reading system comprising components for carrying out object detection, scanning, photoreceiving, A/D conversion, bar code presence detection, symbol decoding, data format conversion, data storage and data transmission functions. In general, the automatic bar code symbol reading device includes a manually actuatable read-repeat switch and control system having a plurality of control centers that control the operation of the system components in accordance with preselected system control operations. Each of the control centers are responsive to control activation signals generated by certain of the system components upon the occurrence of predefined conditions. Certain of the control centers are capable overriding other control centers to provide diverse control capabilities which facilitates execution of intelligent operations and power conservation, during bar code symbol reading. In combination, control system and read-repeat switch enable the device to automatically read a previously read bar code symbol once again, or retransmit or restore symbol character data of a previously read bar code symbol, each time the read-repeat switch is depressed during the system control process of the present invention. This simple procedure can be repeated time and time again to read, in a user-controllable fashion, the same bar code symbol any number of times.

40 Claims, 11 Drawing Sheets

U.S. PATENT DOCUMENTS

| | | |
|---|---|---|
| 4,072,859 | 2/1978 | McWaters . |
| 4,086,476 | 4/1978 | King . |
| 4,136,821 | 1/1979 | Sugiura et al. . |
| 4,240,064 | 12/1980 | DevChoudhury . |
| 4,387,297 | 6/1983 | Swartz et al. . |
| 4,409,470 | 10/1983 | Shepard et al. . |
| 4,431,912 | 2/1984 | Dickson et al. . |
| 4,460,120 | 7/1984 | Shepard et al. . |
| 4,496,831 | 1/1985 | Swartz et al. . |
| 4,521,678 | 6/1985 | Winter . |
| 4,570,057 | 2/1986 | Chadima, Jr. et al. . |
| 4,575,625 | 3/1986 | Knowles . |
| 4,603,262 | 7/1986 | Eastman et al. . |
| 4,639,606 | 1/1987 | Boles et al. . |
| 4,673,805 | 6/1987 | Shepard et al. . |
| 4,736,095 | 4/1988 | Shepard et al. . |
| 4,766,297 | 8/1988 | McMillan . |
| 4,766,299 | 8/1988 | Tierney et al. . |
| 4,816,660 | 3/1989 | Swartz et al. . |
| 4,825,057 | 4/1989 | Swartz et al. . |
| 4,845,349 | 7/1989 | Cherry . |
| 4,877,949 | 10/1989 | Danielson et al. . |
| 4,897,532 | 1/1990 | Swartz et al. . |
| 4,920,255 | 4/1990 | Gabeler . |
| 4,930,848 | 6/1990 | Knowles . |
| 4,933,538 | 6/1990 | Heiman et al. . |
| 4,962,980 | 10/1990 | Knowles . |
| 4,970,379 | 11/1990 | Danstrom . |
| 5,015,833 | 5/1991 | Shepard et al. . |
| 5,017,765 | 5/1991 | Shepard et al. . |
| 5,059,777 | 10/1991 | Wittensoldner et al. . |
| 5,086,215 | 2/1992 | Carsner et al. . |
| 5,132,523 | 7/1992 | Bassett . |
| 5,155,346 | 10/1992 | Doing et al. . |
| 5,180,904 | 1/1993 | Shepard et al. . |
| 5,212,370 | 5/1993 | Wittensoldner et al. . |
| 5,216,231 | 6/1993 | Ouchi . |
| 5,250,790 | 10/1993 | Melitsky et al. . |
| 5,260,553 * | 11/1993 | Rockstein et al. .................... 235/462 |

OTHER PUBLICATIONS

Product Brochure and Schematic Diagram for MH290 Hand Held Laser Scanner by Metrologic Instruments, Inc., Nov. 1987.

Product Brochure and Schematic Diagram for MH290 Hand Held Laser Scanner by Metrololgic Instruments, Inc., Feb. 1989.

Product Brochure of MS131 Microcomputer Controller by Metrologic Instruments, Inc., 1984.

Product Brochure of MS132 Microcomputer Controller by MeEtrologic Instruments, Inc., 1984.

Product Brochure entitled "Metrologic *Bar Code Scanning Systems*" by Metrologic Instruments, Inc., 1985.

* cited by examiner

AUTOMATIC HAND-SUPPORTABLE LASER BAR CODE SYMBOL SCANNER AND METHOD OF READING BAR CODE SYMBOLS USING THE SAME

RELATED CASES

This is a Continuation of patent application Ser. No. 08/662,857, filed on Jun. 12, 1996, which is a Continuation of patent application Ser. No. 08/532,261, filed on Sep. 22, 1995, which is a Continuation of patent application Ser. No. 08/375,068, filed on Jan. 19, 1995, which is a Continuation of patent application Ser. No. 08/150,637 filed on Nov. 8, 1993, which is a Continuation-in-Part of application Ser. No. 07/583,421 filed Sep. 17, 1990, now U.S. Pat. No. 5,260,553, and incorporated herein by reference.

BACKGROUND OF THE INVENTION

1. Field of the Invention

The present invention relates generally to automatic code symbol reading (i.e., recognition) systems, and more particularly to an automatic code symbol reading device having a control system which permits multiple modes of fully automated operation while conserving power and providing versatility in its method of use.

2. Brief Description of the Prior Art

Hitherto, a number of techniques have been proposed for reading bar code symbols using hand-held devices. Despite variety amongst prior art bar code symbol reading devices, the various techniques incorporated into prior art devices can be classified into two principally distinct classes, namely, manually operated or triggered bar code symbol reading devices, and automatic bar code symbol reading devices.

Representative of prior art manually operated bar code symbol reading devices are U.S. Pat. No. 4,387,297 to Swartz, et al., U.S. Pat. No. 4,575,625 to Knowles, and U.S. Pat. No. 4,845,349 to Cherry. While such prior art devices are capable of successful bar code symbol reading, they nevertheless suffer from several significant shortcomings and drawbacks. In particular, the user is required to manually pull a trigger or push a-button each time scanning and decoding is to be cyclically initiated and terminated. The requirement is most fatiguing on the user when large numbers of bar code symbols are to be read. Also, in certain symbol reading applications, such as warehouse inventory, pulling the trigger to initiate scanning of bar code symbols may be extremely difficult for the user due to the physical location of the objects bearing the bar code symbols.

An alternative to manually operated a bar code symbol reading devices is use of automatic bar code symbol readers, which incorporate techniques for automatically initiating and terminating scanning and decoding operations. Representative of prior art automatic bar code symbol devices are U.S. Pat. No. 4,639,606 to Boles, et al. and U.S. Pat. No. 4,933,538 to Heiman et al. While capable of automatically initiating scanning of bar code symbols, such prior art devices and incorporated techniques nevertheless also suffer from significant shortcomings and drawbacks.

In particular, U.S. Pat. No. 4,639,606 to Boles, et al. discloses laser emission control circuitry for use in implementing a hand-held triggerless bar code scanner. The laser is operated in a pulsed "find paper" mode until a reflected signal is obtained, indicating the presence of an object (e.g., paper) in the search field. Thereupon, the circuitry is changed to a "search mode" in which the power of the laser is increased to above the safety limits for a period of time, and the return signal is monitored for signal transitions corresponding to the black bars of the code. On detection of the first black bar, the circuitry is changed to an "in-code" (decode) mode as long as successive symbols are received within a given period of time. If the decode mode terminates within a predetermined time interval (e.g., one second after the beginning of the search mode), then the search mode is re-entered, otherwise the decode mode will change to find paper mode.

While the triggerless bar code symbol reader proposed in U.S. Pat. No. 4,639,606 possesses three modes of operation, this prior art bar code symbol reader nevertheless suffers from several significant shortcomings and drawbacks. In particular, this prior art bar code symbol reader requires continuous use of a pulsed laser beam to determine the presence of an object within the scan field, which, in hand-held portable battery power devices, undesirably drains limited power reserves, especially in extended time duration bar code reading applications. Furthermore, by its very design this prior art automatic bar code symbol reader, by its very design, will reread the same bar code symbol every 40 milliseconds provided the bar code symbol is decoded each time within a 1 millisecond or less time period. Consequently, when using this prior art bar code symbol reader, the user has no ability to manually control its operation in order to selectively read a bar code symbol one or more times as desired.

U.S. Pat. No. 4,933,538 discloses a bar code symbol scanning system, which in the "object sensor mode" the scanner is triggerless and the constantly on laser beam normally emits at a narrow angle and low power. When an indicia pattern indicative of a bar code symbol has been detected, the laser beam will widen, the power of the beam will increase, and the beam will read the entire symbol. While this prior art scanning technique permits detection of bar code symbols within the scan field in order that the power of the laser beam may be automatically increased to a higher level for collecting scan data for use in decoding operations, this prior art system nevertheless suffers from several significant shortcomings and drawbacks as well. In particular, this prior art system requires continuous use of laser emission to determine the presence of both objects and bar code symbols within the scan field, which necessarily results in drain of limited power reserves in portable battery power applications. Furthermore, when using this prior art bar code symbol reader, the user is incapable of manually controlling the reading of the same bar code symbol one ore more times, as desired or required in a particular bar code symbol reading application.

In general, prior art automatic bar code symbol reading devices also suffer from other shortcomings and drawbacks. For example, unlike manually operated devices which rely on the user to activate a trigger, once for each bar code to be read, prior art triggerless (i.e., automatic) bar code symbol reading devices also lack programmed intelligence capabilities which are necessary to prevent undesired multiple reading of bar code symbols, particularly when the scanning beam is permitted to dwell on a bar code symbol for extended periods of time.

Furthermore, prior art automatic bar code symbol reading devices have generally lacked control capabilities which permits diverse modes of programmable system-control operation which ensure power conservation, while preventing inadvertent or undesired multiple reads of the same bar code symbol.

Thus, there is a great need in the code symbol reading art for a fully automatic code symbol reading device which overcomes the above shortcomings and drawbacks of prior art devices and techniques.

OBJECTS OF THE PRESENT INVENTION

Accordingly, it is a primary object of the present invention to provide a fully automatic hand-supportable bar code symbol reading device capable of automatically reading bar code symbols in accordance with user-selectable system-control operations.

A further object of the present invention is to provide such an automatic bar code symbol reading device with a manually actuatable "read-repeat" button for instructing the device to automatically read once again a bar code symbol present in the scan field, without the need to remove either the object, or the previously read bar code symbol located thereon, from the scan field.

A further object of the present invention is to provide such an automatic bar code symbol reading device with a mechanism that enables the user to controllably read a previously read bar code symbol one or more times by momentarily removing either the decoded bar code symbol or object bearing the same, from the scan field.

A further object of the present invention is to provide such an automatic bar code symbol reading device with control system having a plurality of control centers, each being assigned predetermined control functions that enable operation of particular device components in accordance with a user-selected system-control operation.

A further object of the present invention is to provide such an automatic bar code symbol reading device, in which upon the occurrence of predetermined conditions, one or more of the control centers are capable of overriding certain of the other control centers so that a wide number of system-control operations can be carried out in a power conserving manner, to permit automatic reading of bar code symbols in a variety of diverse applications.

Another object of the present invention is to provide such an automatic bar code symbol reading device, in which the system control architecture readily permits extension of additional system-control operations by formulating and programming functions between a fixed number of control activation signals and enable signals provided as input and output signals respectively, to one or more control centers.

A further object of the present invention is to provide an automatic hand-holdable bar code symbol reading device which is capable of determining the presence of an object without enabling the scanning means of the device.

Another object of the present invention is to provide a hand-holdable bar code symbol reading device which is capable of distinguishing between a bar code symbol and a regular pattern of light and dark areas such as that formed by printed characters, and to only enable decode processing of scan data upon the detection of a bar code symbol in the scan field of the device.

An even further object of the present invention is to provide an automatic bar code symbol reading device which prevents multiple reading of the same bar code symbol due to dwelling of scanning beam thereupon for an extended period of time.

Yet a further object of the present invention is to provide an improved method of automatically reading bar code symbols using the device of the present invention.

These and further objects of the present invention will become apparent hereinafter and in the claims to invention.

SUMMARY OF THE INVENTION

According to one of the broader aspects of the present invention, there is provided a fully automatic hand-holdable bar code symbol reading system.

In general, the automatic bar code reading device comprises system activation means, scanning means, photoreceiving means, analog-to-digital conversion means, bar code presence detection means, and symbol decoding means. The purpose of the system activation means is to provide a first control activation signal indicative of the presence of an object in the scan field. The purpose of the scanning means is to produce a light beam and scan the light beam across the scan field. The purpose of the photoreceiving means is to detect at least a portion of light of variable intensity reflected off the object in the scan field and produce an analog signal indicative of the detected light intensity. The purpose of the analog-to-digital conversion means is to convert the analog data signal into a digital data signal indicative of the detected light intensity. The purpose of the bar code presence detection means is to produce a second control activation signal upon detecting the presence of a bar code symbol on the object in the scan field, on the basis of the analog or digital data signal. The purpose of the symbol decoding means, on the other hand, is to produce symbol character data and a third control activation signal upon decoding a bar code symbol on the basis of the digital data signal. Notably, the produced symbol character data will correspond to the decoded bar code symbol.

Another aspect of the present invention is to embed the above-described system components within a control system having individual control centers, each of which are responsive to particular control activation signals generated by the system components. In accordance with the architecture of the control system, certain of the control centers can override other control centers, providing a marked increase in system-control operation and versatility.

Based on the control system of the present invention, it is yet further possible to now read bar code symbols in a fully automatic manner without risk of inadvertent multiple reads and the like, owing to the fact the control architecture of the present invention provides intelligence capabilities to the system.

BRIEF DESCRIPTION OF THE DRAWINGS

For a fuller understanding of the Objects of the Present Invention, the Detailed Description of the Preferred Embodiment should be read in connection with the attached drawings, wherein.

DETAILED DESCRIPTION OF THE ILLUSTRATIVE EMBODIMENT

The automatic bar code symbol reading system 1 of the present invention, is generally illustrated in FIGS. 1 through 10.

Figure 2:
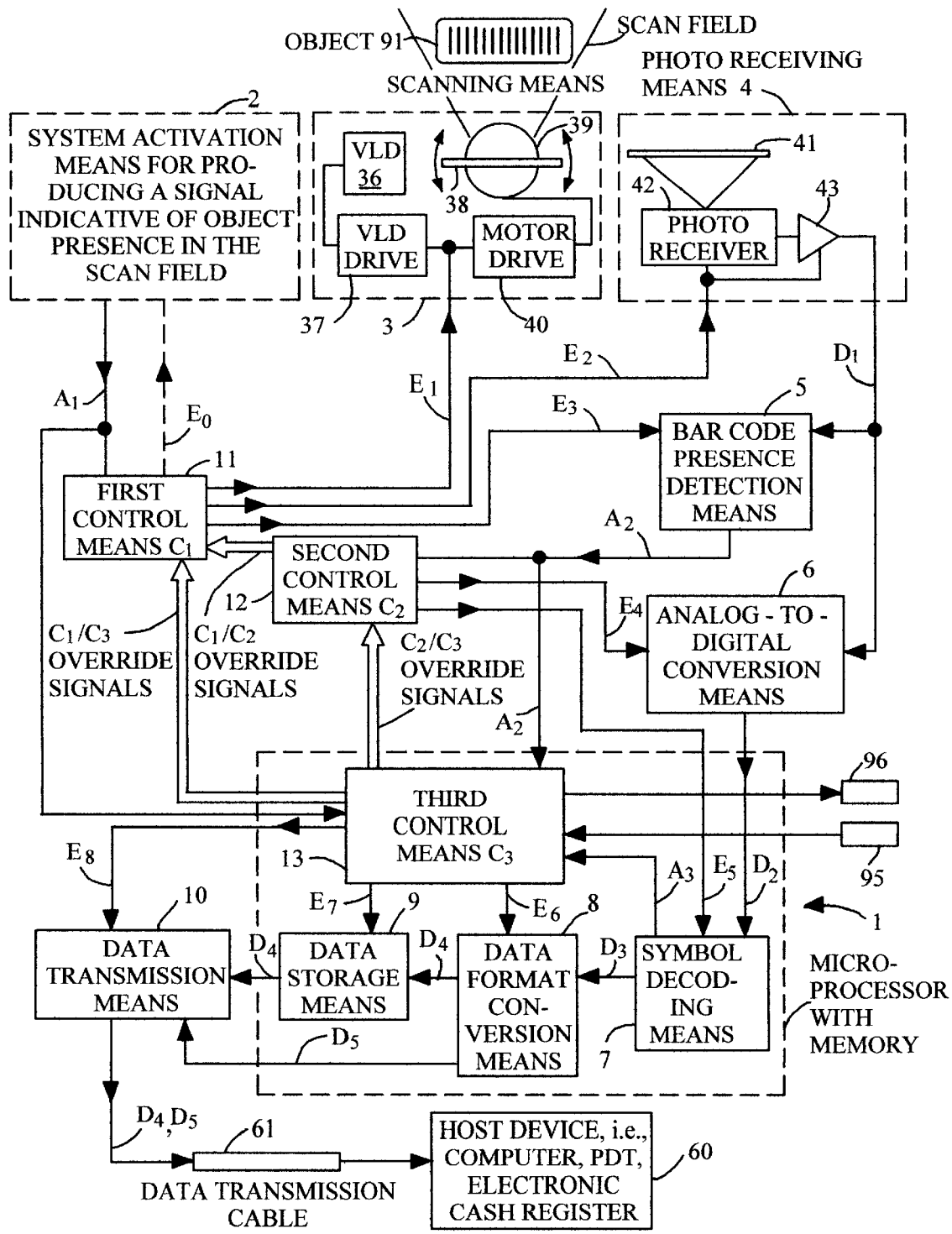
FIG. 2 is block functional system diagram of the bar code symbol reading device of the present invention, illustrating the principal components of the device as being integrated within the control system hereof.

As shown in FIG. 2, bar code symbol reading system 1 comprises a number of system components, namely, system activation means 2, scanning means 3, photoreceiving means 4, bar code presence detection means 5, analog-to-digital (A/D) conversion means 6, symbol decoding means 7, data format conversion means 8, symbol character data storage means 9, and data transmission means 10. As illustrated, these system components are embedded within a programmable control system having a unique architecture which provides a great degree of versatility in system capability and operation, as well as power conservation. The structure, function and advantages of this control system architecture will be described in great detail hereinafter.

The control system of the present invention comprises essentially three major components, namely first control means ($C_1$) 11, second control means ($C_2$) 12, and third control means ($C_3$) 13. As will be described in greater detail hereinafter, second control means 12 is capable of "overriding" (i.e., exhibit and/or enable) first control means 11, whereas third control means 13 is capable of overriding second control means 12 and first control means 11. As shown in FIG. 2, such control override functions are carried out by the generation of control override signals (i.e., $C_1/C_2$, $C_1/C_3$, and $C_2/C_3$) transmitted between respective control structures.

While not illustrated in the drawings for purposes of clarity and avoidance of obfuscation, automatic bar code symbol reading device 1 includes a conventional power supply which is capable of providing requisite power to each of the system components, when and for time prescribed by the control system hereof. Typically, an on/off power switch or functionally equivalent device will be provided external to housing 14 to permit the user to turn on device 1. When power switch is initially engaged to its ON position, power will only be provided to system activation means 2 to enable its operation, while, for example, only biasing voltages and the like are provided to all other system components so that they are each initially disabled from operation.

Figure 1A:
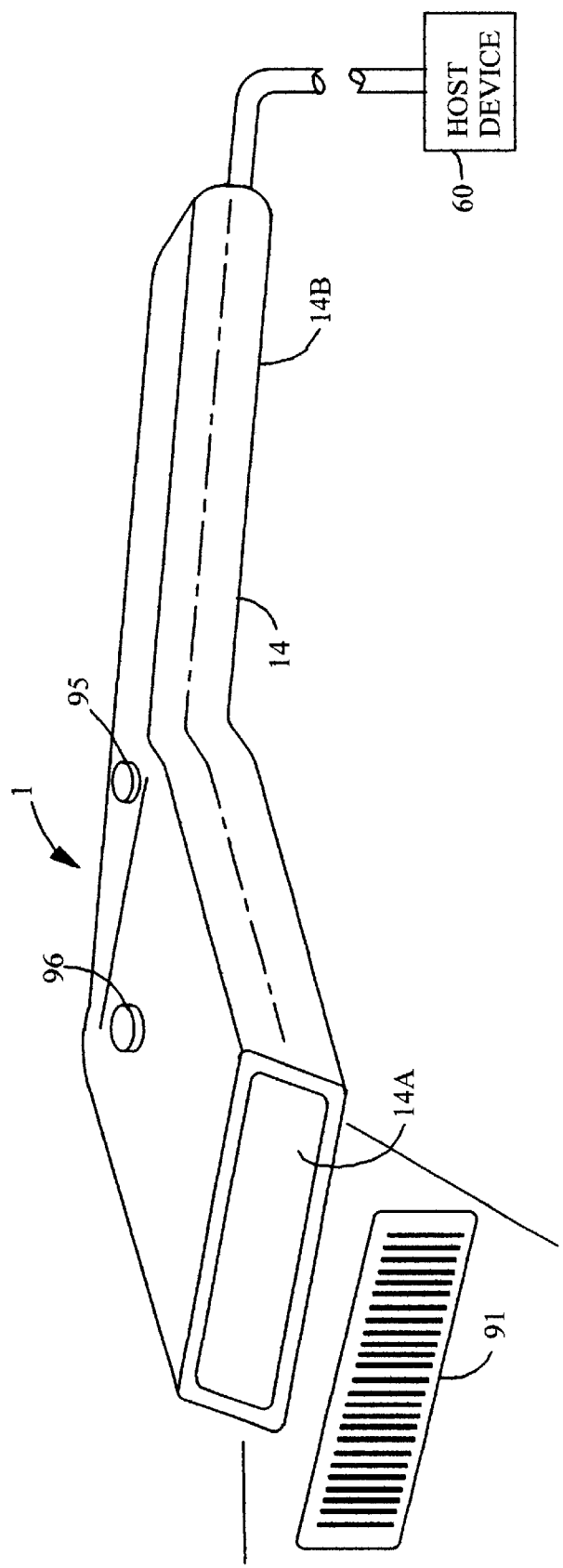
FIG. 1A is a perspective view of an automatic hand-holdable laser bar code symbol reading device constructed in accordance with the principles of the present invention.
Figure 3A:
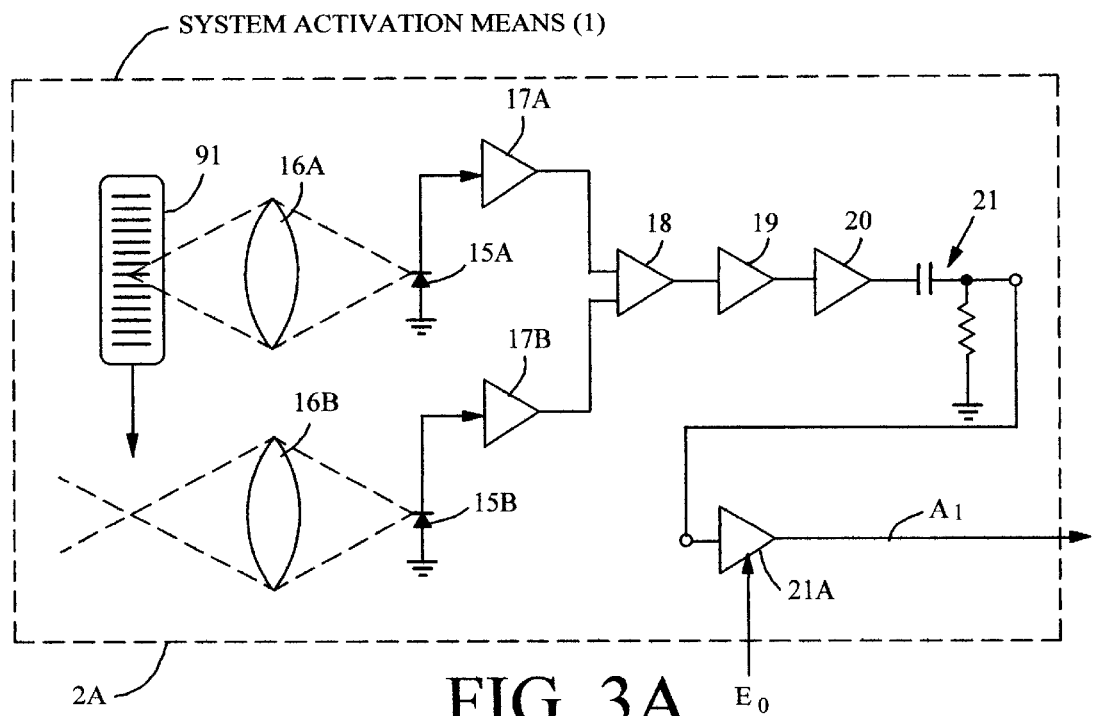
FIG. 3A is a block functional diagram of a first embodiment of the system activation means of the bar code symbol reading device of the present invention.
Figure 3B:
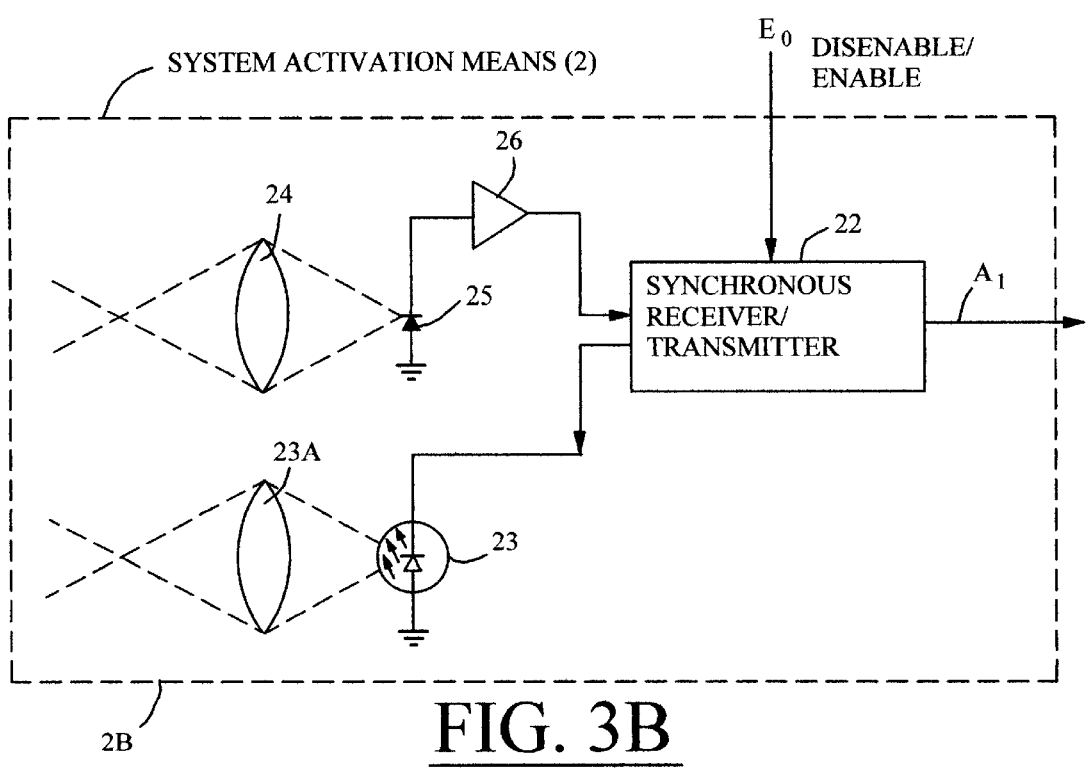
FIG. 3B is a block functional diagram of a second embodiment of the system activation means of the present invention.

In accordance with the present invention, the purpose of system activation means 2 is to produce first control activation signal $A_1$ upon determining (i.e., detecting) the presence of an object (e.g., product, document, etc.) within the scan field of bar code symbol reading device 1, as illustrated in FIG. 1A. In turn, first control activation signal $A_1$ is provided as input to both first and third control means 11 and 13, respectively. In FIGS. 3A and 3B, two different approaches to generating first control activation signal $A_1$ are disclosed.

In FIG. 3A, a passive technique is illustrated, in which passive detection of ambient light within the scan field is performed in order to determine if an object is present within the scan field of the automatic bar code symbol reading device 1. As illustrated in FIG. 3A, passive ambient light detection circuit 2A comprises a pair of photo diodes 15A and 15B, which sense ambient light gathered from two different parts of the scan field in front of device 1, using focusing lenses 16A and 16B, respectively. The output signals of photodiodes 15A and 15B are converted to voltages by current-to-voltage amplifiers 17A and 17B respectively, and are provided as input to a differential amplifier 18. The output of differential amplifier 18 is provided as input to a sample and hold amplifier 19 in order to reject 60 and 120 Hz noise. Output signal of amplifier 19 is provided as input to a logarithmic amplifier 20 to compand signal swing. The output signal of logarithmic amplifier 20 is provided as input to a differentiator 21 and then to a comparator 21. The output of comparator 21 provides first control activation signal $A_1$.

In FIG. 3B, an active technique is illustrated in which an infrared signal is transmitted out into the scan field and first control activation signal $A_1$ is generated upon receiving a reflection of the transmitted signal off an object within the scan field. As illustrated in FIG. 3B, infrared object detection circuit 2B comprises a synchronous receiver/transmitter 22, which includes an infrared LED 23 which generates a 900 nanometer pulsed signal at a rate of 2.0 KHZ. This pulsed signal is transmitted through focusing lens 23 to illuminate the scan field. When an object is present within the scan field, a reflected pulse signal is produced and focused through focusing lens 24 onto photodiode 25. The output of photodiode is corrected to a voltage by current-to-voltage amplifier 26, and the output thereof is provided as input to receiver/transmitter 22, to synchronously compare the received signal with the transmitted signal and determine if an object is present in the scan field. If so, then synchronous receiver/transmitter 22 produces first control activation signal $A_1=1$ indicative of such condition. First control activation signal $A_1=1$ upon being generated activates first control means 11 which, in turn, enables operation of scanning means 3, photoreceiving means 4, and bar code presence detection means 5, as will be described in greater detail hereinafter. In order to conserve power and improve signal-to-noise ratio at photoreceiving means 4 during scan data collection operations, it is preferable for first control means 11 to generate and provide a disable signal $E_0$ to infrared object detection circuit 2B whenever first control means 11 enables the scanning means 3.

Figure 5:
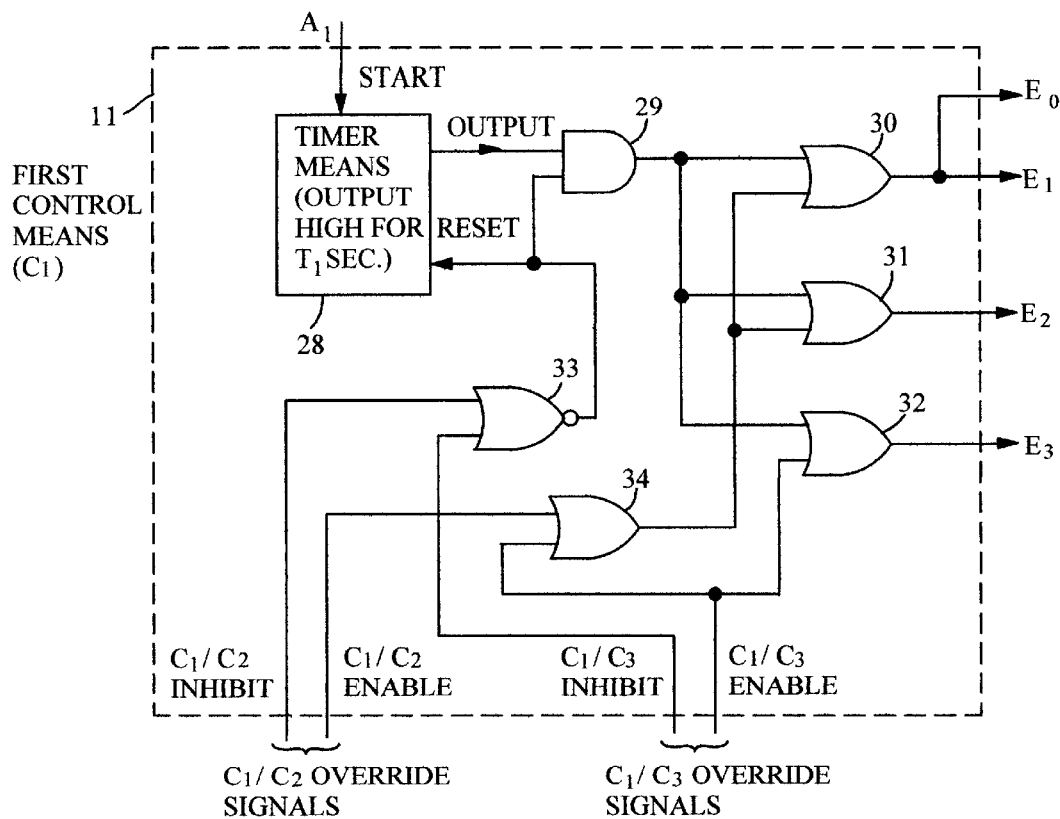
FIG. 5 is a logical functional diagram of the first control means of the control system of the present invention.

As illustrated in FIGS. 2 and 5, first control means 11 is preferably realized by a circuit capable of generating enabling signals $E_1$, $E_2$ and $E_3$ for the scanning means, photoreceiving means and bar code presence detection means, respectively. As will be described in detail hereinafter, the specific operation of first control means 11 is dependent on the state of three sets of input signals, namely, first control activation signal A, $C_1$ override signals from $C_2$ (i.e., $C_1/C_2$ inhibit signal and $C_1/C_2$ enable signal), and $C_1$ override signals from $C_3$ (i.e., $C_1/C_3$ inhibit signal and $C_1/C_3$ enable signal). As shown, first control activation control signal $A_1$ is provided to the "START" input of timer 28 upon which it produces a "high" output signal for a first predetermined time period (i.e., $T_1$ seconds). Preferably, time period $T_1$, is selected to be about 0.3 seconds.

As illustrated in FIG. 5, the output signal of timer 28 is provided as an input to AND gate 29, with its other input connected to the RESET input of timer 28. The output of AND gate 29 is provided as an input to each of OR gates 30, 31 and 32. $C_1/C_2$ inhibit signal from second control means 12 and $C_1/C_3$ inhibit signal from third control means 13 are provided as inputs to NOR gate 33, whereas $C_1/C_2$ enable signal from second control means 12 and $C_1/C_3$ enable from third control means 13 are provided as inputs to OR gate 34. As shown, the output signal of OR gate 34 is provided to the other input of OR gates 30 and 31, whereas the output signal from NOR gate 33 is provided as input to AND gate 29. $C_1/C_3$ enable signal is also provided as input to OR gate 32, to complete the description of the circuit realization of first control means 11. As indicated in FIG. 5, the outputs of OR gates 30, 31 and 32 provide enable signals $E_1$, $E_2$ and $E_3$ for the scanning means, photoreceiving means and bar code presence detection means, respectively. Notably, disable signal $E_0$ is produced from the output of OR gate 30.

As illustrated in FIG. 2, scanning means 3 comprises a light source 36 which, in general, may be any source of intense light suitably selected for maximizing the reflectively from the object. In the preferred embodiment, light source 36 comprises a solid-state visible laser diode (VLD) which is driven by a conventional driver circuit 37. In order to deflect the laser beam output from laser diode 36 over a scan field having a predetermined spatial extent in front of front portion 14A of housing 14 in FIG. 1A, a conventional scanning mirror 38 can be oscillated back and forth by a stepper motor 39 driven by a conventional driver circuit 40, as shown. However, one of a variety of conventional scanning mechanisms may be alternatively used with excellent results. To selectively activate both laser light source 36 and motor 39, scanning means enable signal $E_1$ is provided as an input to both driver circuits 37 and 40. When enable signal $E_1$ is a logical "high" level (i.e., $E_1=1$), scanning means 3 is operable, a laser beam is generated and scanned across the scan field, and scan data is thereby produced off any object residing within the scan field.

In a conventional manner, when an object, such as product bearing a bar code symbol, is within the scan field at the time of scanning, the laser beam incident thereon will be reflected, producing a laser light return signal of variable intensity which represents a spatial variation of light reflectivity characteristic of the spaced apart pattern of bars comprising the bar code symbol. Photoreceiving means 4 is provided for the purpose of detecting at least a portion of laser light of variable intensity, which is reflected off the object and bar code symbol within the scan field. Upon such detection, photo receiving means 4 produces an analog data signal $D_1$ indicative of the detected light intensity. In general, photoreceiving means comprises scan data collection optics 41, such as a focusing mirror, which focus scan data signals for subsequent detection by a conventional photo receiver 42. Photoreceiver 42 in turn, produces an analog signal indicative of the intensity of the scan data signal, which is subsequently amplified by preamplifier 43 to produce analog scan data signal $D_1$. In combination, scanning means 3 and photoreceiving means 4 operate to generate scan data from the scan field, over time intervals specified by first control means 11 during normal (i.e., noncontrol-override) modes of operation, and by third control means 13 during "control override" modes of operation. As will illustrated hereinafter, this scan data is used by both bar code presence detection means 5 and symbol decoding means 6.

As illustrated in FIG. 2, analog scan data signal $D_1$ is provided as input to both bar code presence detection means 5 as well as A/D conversion means 6. The primary purpose of bar code presence detection means 5 is to determine whether a bar code is present in or absent from the scan field, over time intervals specified by first control means 11 during normal modes of operation and by third control means 13 during control override modes of operation. When the presence of a bar code symbol in the scan field is determined, the bar code presence detection means 5 generates second control activation signal $A_2$ (i.e., $A_2=1$) which is provided as input to second control means 12, as shown in FIG. 2.

Figure 4:
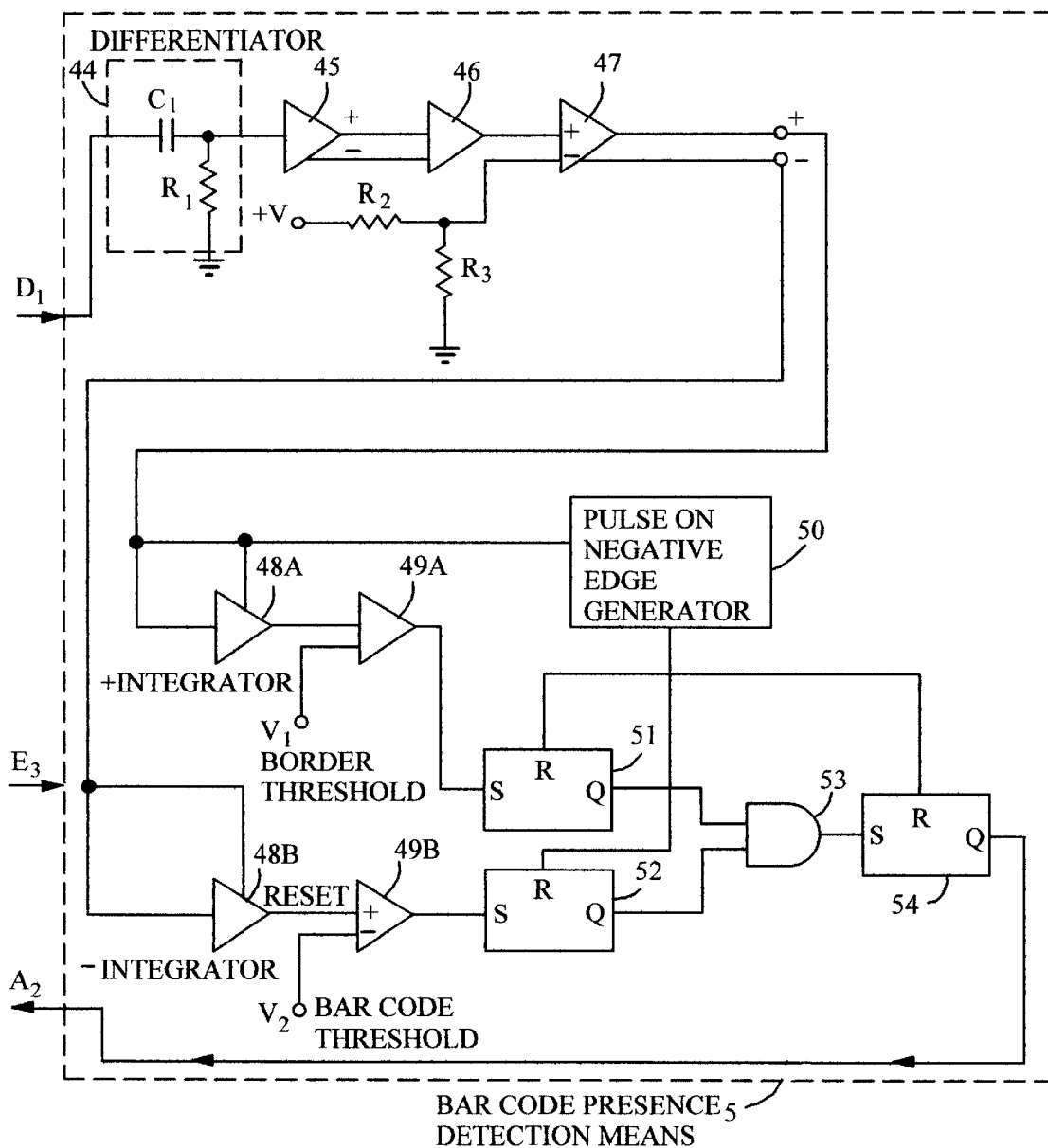
FIG. 4 is a block functional diagram of the bar code presence detection means of the bar code symbol reading device of the present invention.

As illustrated in FIG. 4, bar code presence detection means 5 is provided with enable signal $E_3$ which is used to enable circuitry employed in the realization of the bar code presence detection means. In the preferred embodiment, bar code presence detection means 5 is realized as a bar code envelope detector which processes analog scan data signal $D_1$ so as to produce a signal, the intensity of which indicates the general envelope of a bar code within the scan field. Upon such detection, bar code envelope detector 5 produces second control activation signal $A_2=1$ which is provided as input to second control means 12.

As shown in FIG. 3, analog scan data signal $D_1$ is provided as input to a differentiater 44 comprising capacitance element $C_1$ and resistive element $R_1$, to produce the first derivative signal of signal $D_1$. The first derivative signal is then amplified by a differential output amplifier 45, to produce as output amplified positive and negative first derivative signals, which in turn are provided as input to a positive peak detector 46. The output signal of positive peak detector 46 is provided as input to a comparator 47 which generates positive and negative bar code detect (BCD) signals.

As illustrated in FIG. 4, the positive and negative BCD signals are then provided as input and RESET signals to both integrators 48A and 48B. Positive BCD signal is also provided as input to pulse generator 50, which generates pulses upon the detection of the negative edges of the positive BCD signal. As shown, the output signals of integrators 48A and 48B are provided as first inputs to comparators 49A and 49B respectively, whereas an envelope border threshold voltage $V_1$ and bar code threshold voltage $V_2$ are provided as second inputs to comparators 49A and 49B, respectively. Boarder voltage $V_1$ is a DC reference voltage whose value can be determined on the basis of the time constant of integrator 48A, its gain, and the time duration of the minimum required "boarder width" of the bar code symbol. Bar code threshold $V_2$ is also a DC reference voltage whose value can be determined on the basis of the time constant of integrator 48B, its gain, and the time duration of the minimum required "bar code length".

The output of comparators 49A and 49B are provided to the S gates of latches 51 and 52, respectively, and the Q gates of these latches are provided as inputs to AND gate 53, as shown in FIG. 4. The output of AND gate 53 is provided as input to the S gate of latch 54, whereas the R gate of latch 54 is connected to the R gate of latch 51. The output of pulse generator 50 is provided as input to the R gate of latch 52. The output of latch 54 provides second control activation signal $A_2$, which in turn, is provided as input to second control means 12, as shown in FIG. 2. The operation of the bar code envelope detector 5 is essentially as follows. If the output signals of both comparators 49A and 49B go "high" before the next RESET pulse from pulse generator 50 is provided to latch 52, then the output of latch 54 will go "high" (i.e., $A_2$=1) indicating that a bar code is present in the scan field.

In general, when the presence of a bar code in the scan field is detected, second activation control signal $A_2$ is generated, second control means 12 is activated and first control means 11 is overridden by second control means 12 through the transmission of control override signals (i.e., $C_1/C_2$ inhibit and $C_1/C_2$ enable signals) from the second control means.

Figure 6:
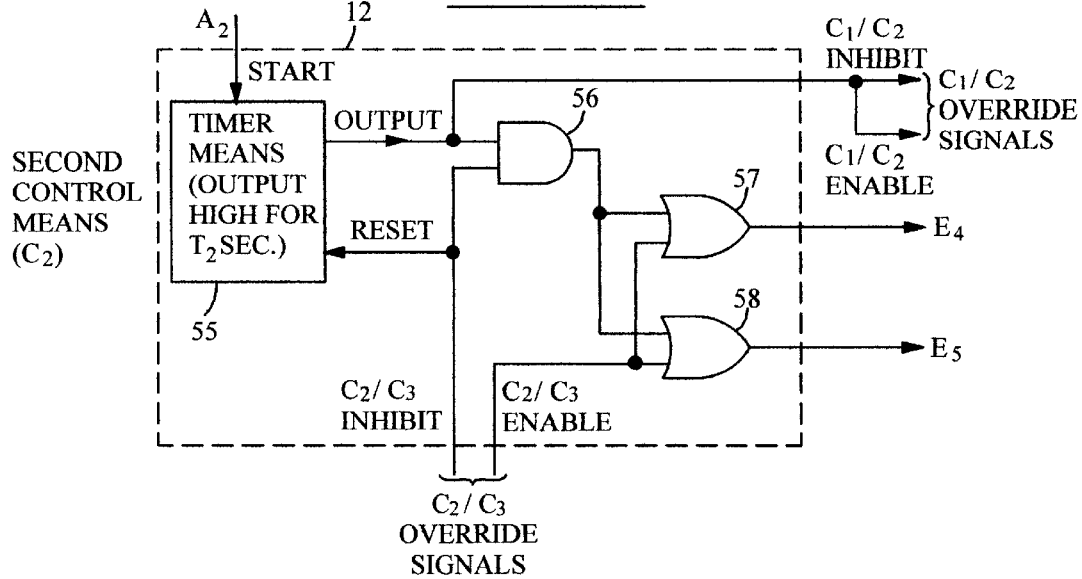
FIG. 6 is a logical function diagram of the second control means of the control system of the present invention.

As illustrated in FIG. 6, second control means 12 preferably includes a timing means 55 whose output signal remains high for a second predetermined time period $T_2$. Preferably, time period $T_2$ is selected to be about 1.0 seconds. Second control activation signal $A_2$ is provided to the start input of timing means 55, while the output thereof is provided as an input to AND gate 56, as shown. Third control means 13 provides a pair of $C_2$ override signals (i.e., $C_2/C_3$ A and $C_2/_3$B), as input to second control means 12, as shown in FIG. 2. The $C_2/C_3$ inhibit signal is provided to the second input of timing means 55. The $C_2/C_3$ enable signal, on the other hand, is provided to the first input of OR gates 57 and 58, whereas the output of AND gate 56 is provided as second input to each of OR gates 57 and 58. As illustrated in FIG. 6, the output signal of timing means provides both $C_1/C_2$ inhibit and $C_1/C_2$ enable signals, whereas the output of OR gates 57 and 58 provides enable signals $E_4$ and $E_5$ for enabling A/D conversion means 6 and symbol decoding means 7, respectively.

Upon detecting the presence of a bar code in the scan field, second control activation signal $A_2$ activates second control activation means 12 which, in turn, directly enables A/D conversion means 6 and symbol decoding means 7 by enabling signals $E_4$ and $E_5$, respectively. Indirectly, second control means 12 enables scanning means 3 and photoreceiving means 4 and disables bar code presence detection means 5 by providing $C_1$ override signals to first control means 11.

A/D conversion means 7 can be realized by any conventional A/D circuit or chip, and functions to convert analog scan data signal D into a digital scan data signal $D_2$, corresponding to the detected intensity of laser light collected and detected at photoreceiving means 4. The digitized scan data signal $D_2$ is provided as input to symbol decoding means 7, which scan line by scan line, decodes processes in a conventional manner, the stream of digitized scan data. The decoding means 7 processes a scan line of the digital scan data at a time, in an attempt to decode a valid bar code symbol within the second predetermined time period $T_2$ established and monitored by timing means 55 of second control means 12. If decoding means 7 successfully decodes a bar code symbol within time period $T_2$, symbol character data $D_3$ (typically in ASCII code format) is produced corresponding to the decoded bar code symbol. Thereupon third control activation signal $A_3$ is produced by symbol decoding means 7 and is provided to third control means 13 to activate the same. In response, third control means 13 provides override control signals to first control 11 and second control means 12, as described hereinabove.

As illustrated in FIGS. 2 and 7, third control means 13 of the illustrated embodiment generates and provides enable signals $E_6$, $E_7$ and $E_8$ to data format conversion means 8, data storage means 9 and data transmission means 10. As shown, symbol decoding means 7 provides symbol character data $D_3$ to data format means 8 to convert data $D_3$ into two differently formatted types of symbol character data, namely $D_4$ and $D_5$. Format-converted symbol character date $D_4$ is of the "packed data" format, particularly adapted for efficient storage in data storage means 9. Format-converted symbol character data $D_5$ is particularly adapted for data transmission to a host device 60, such as a computer, or electronic cash register. When symbol character data $D_4$ is to be converted into the format of the users choice based on a selected option mode, third control means 13 generates and provides enable signal $E_6$ to data storage means 9, as shown in FIG. 2. Similarly, when format converted data $D_5$ is to be transmitted to host device 60, the third control means 13 generates and provides enable signal $E_8$ to data transmission means 10, which thereupon transmits format-converted symbol character data $D_5$ to host device, via a conventional data transmission cable 61.

Figure 1B:
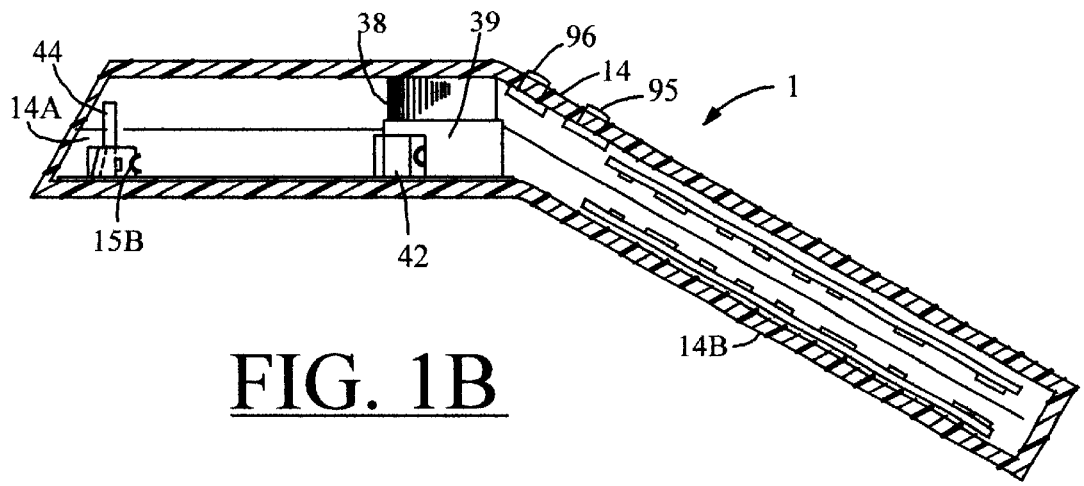
FIG. 1B is a cross-sectional elevated side view along the longitudinal extent of the bar code symbol reading device of FIG. 1A, showing various hardware and software components used in realizing the illustrated embodiment.
Figure 1C:
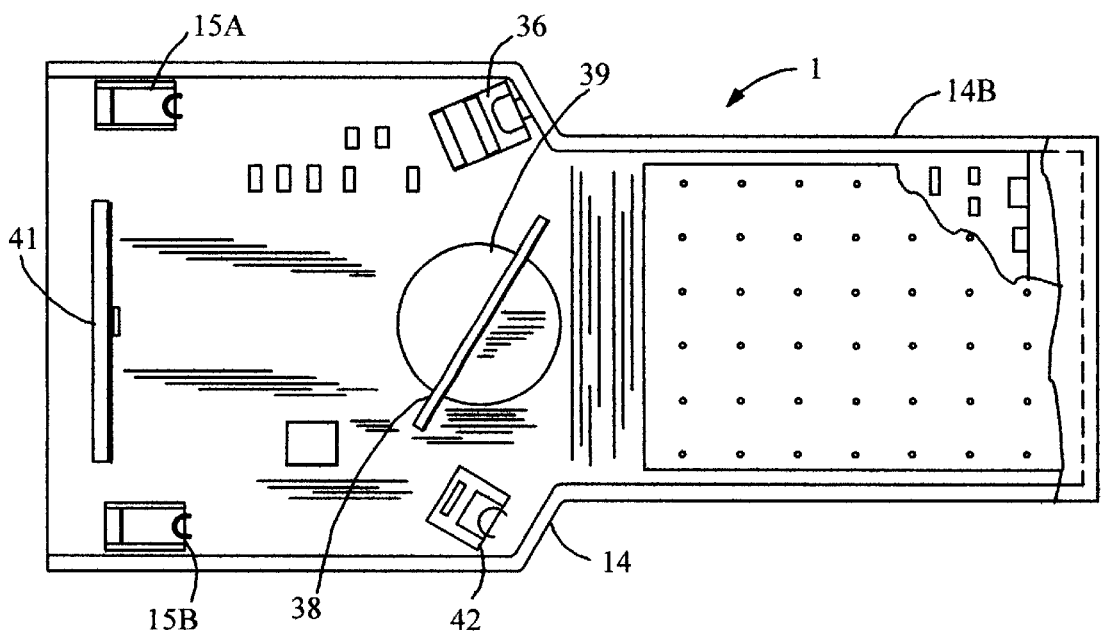
FIG. 1C is a cross-sectional plan view along the longitudinal extent of the bar code symbol reading device of FIGS. 1A and 1B, also showing the various components used in realizing the illustrated embodiment.

As illustrated in FIGS. 1, 1A and 2, the automatic bar code symbol reading device of the illustrative embodiment includes at manually actuatable "read-repeat" button (i.e., switch) 95 and a visible "read-repeat" LED indicator 96, both mounted through the upper top portion of the housing. As will be described in greater detail hereinafter, the function of this manually actuatable button is to generate and provide a step-type pulse to the third control means 13, which in response thereto, sets a read-repeat flag within the third control means. Depending upon when the read-repeat flag is set to "1" during the system control process, this may indicate that one of two functions can be automatically performed by the system. Specifically, setting the read-repeat flag to "1" can serve to indicate (i) that the system should be permitted to read another bar code symbol without detecting the absence of the previously read bar code symbol or object from the scan field, or (ii) that the system should either retransmit to the host device the symbol character data of the previously read bar code symbol, or store in data storage means 9 once again the symbol character data of the previously read bar code symbol. This feature of the present invention can be used in connection with the other symbol repeat-read capabilities of the system, which rely on the automatic detection of the removal of the bar code symbol or object from the scan field (after a successful read) in order to re-read the same bar code symbol under the manual control of the user. As will become apparent hereinafter, such functionalities are highly advantageous when desiring to read the bar code symbols on a number of identical products, which occurs often in point-of sale (POS) and inventory applications.

In the illustrated embodiment, third control means 13, symbol decoding means 7, and data format conversion means 8 and data storage means 9 are realized using a single programmable device, such as a microprocessor 63 having accessible memory and external timing means. In this way, conventional symbol decoding and data format conversion processing can be implemented in a straightforward manner. As for the programming microprocessor to realize third control means 13 and the control functions which it performs in the illustrated embodiment, reference is made to FIG. 2, 5, 6, 7A and 7B in particular. In order to illustrate the nature of this programming and how it can be realized starting from a high level flow chart, System-Control Operation No. 2, illustrated in FIGS. 8A and 8B, will be used as an example.

Figure 7A:
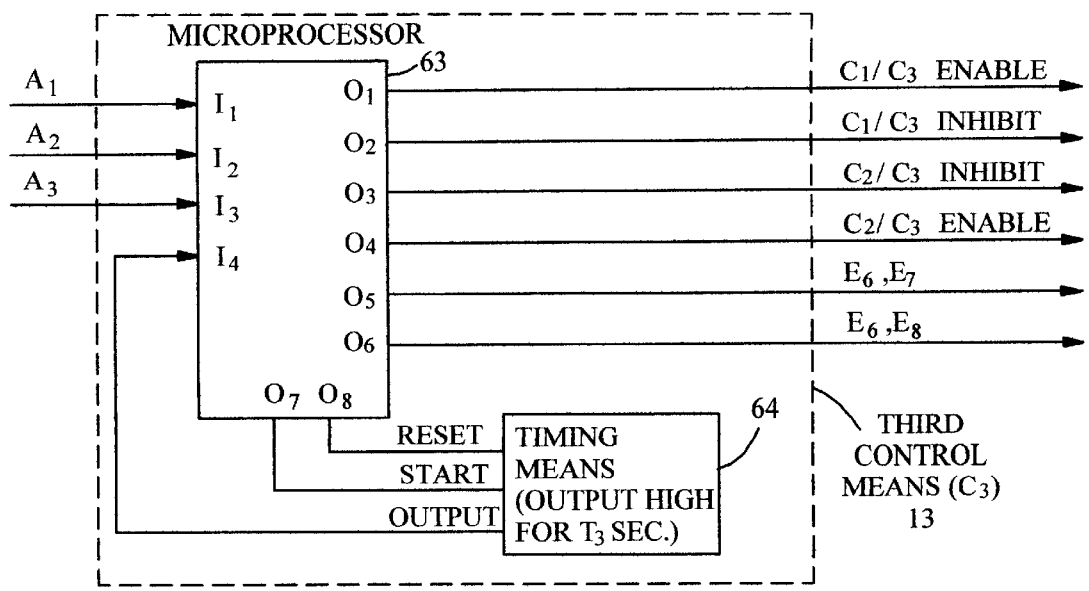
FIG. 7A is a functional block diagram of the third control means of the control system of the present invention.

In FIG. 7A, the third control means is shown implemented with a timer 64 and microprocessor 63, whose input pins $I_1$ through $I_4$ and output pins $O_1$ through $O_8$ are utilized in achieving the control functions performed during System-Control Operation No. 2. In order to illustrate the programmed operation of the third control means during System-Control Operation No. 2, reference is made to FIGS. 7A and 7B of the drawings.

In FIG. 7A, the output of timer 64 is provided to input pin $I_4$ of microprocessor 63, whereas outputs $O_7$ and $O_8$ thereof are provided as start and reset signals respectively, to timer 64 as shown. Timer 63 is selected to elapse at $T_3$, which preferably will be about 2–3 seconds. Notably, each input $I_1$ through $I_4$, output $O_1$ through $O_8$, control activation signals $A_1$ through $A_3$, and enable signal $E_1$ through $E_8$, may take on either a logical "high" value (i.e., 1), or a logical "low" value (i.e., 0). As; illustrated in FIGS. 8A and 8B, during progression through System-Control Operation No. 2, the presence of third control activation signal $A_3$ (i.e., $A_3=1$) activates third control means 13. The presence of such signal value at the third control means indicates a valid bar code symbol has been decoded by symbol decoder 7. At the point of activation of third control means 13, the possible logical operations that may occur therewithin (illustrated in flow chart of FIG. 7B), are dependent upon the condition of the first and second control activation signals $A_1$ and $A_2$ and the input $I_4$ from the output of timer 64.

Figure 7B:
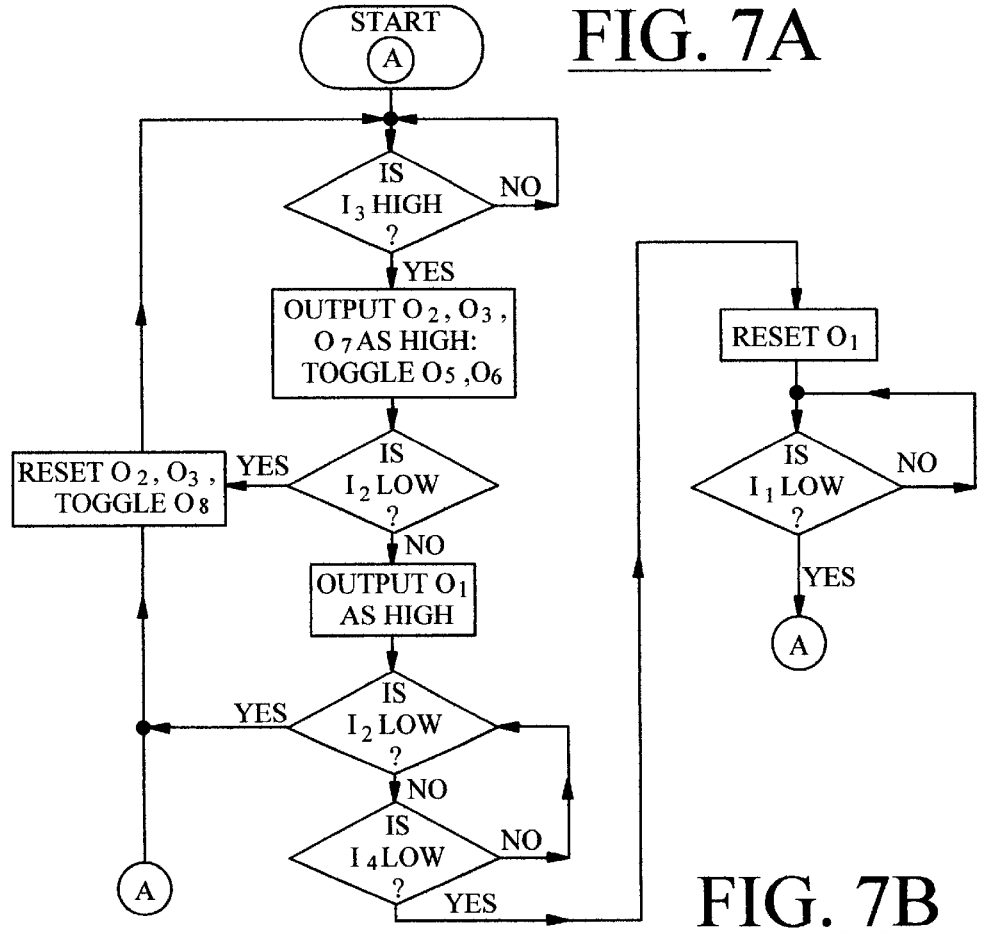
FIG. 7B is a flow chart of a control program carried out in the third control means for the case of system-control operation No. 2 (i.e., path option 2) of the illustrated embodiment.

As illustrated in FIG. 7B, if control activation signals $A_3$ input at $I_3$ is "low" (i.e., $A_3=0$), then the control program of the third control means returns to "start" and once again continuously senses for the presence of third control activation signal (i.e., $A_3=1$). Otherwise, if third control activation signal $A_3$ input at $I_3$ is high (i.e., $A_3=1$), then the control program outputs $O_2$, $O_3$ and $O_7$ as high, inhibiting first and second control means 11 and 12, and starting timer ($T_3$) 64, while toggling outputs $O_5$ and $O_6$ to enable data format conversion means 8 and data storage means 9 or data transmission means 10.

Then, the control program proceeds to determine whether the first control activation signal $A_1$ at input $I_1$ is absent (i.e., $A_1=0$), indicative of no object in scan field; if so, then the control program resets outputs $O_2$ and $O_3$ to return control to the inhibited first and second control means, while toggling output $O_8$ to reset timer ($T_3$) 64. Otherwise, if input $I_1$ is high, indicative of an object in the scan field, then the control program outputs $O_1$ as high, enabling third control means 13 to override first control means 11, while enabling scanning means 3 photoreceiving means 4 and bar code presence detection means 5.

The control program then determines whether second control activation signal $A_2$ at input $I_2$ is low (i.e., $A_2=0$), indicative of no bar code present in the scan field; if so, the program resets outputs $O_2$ and $O_3$ to return control to the first and second control means, while toggling output $O_8$ to reset timer ($T_3$) 64. Otherwise, if second control activation signal $A_2$ at $I_2$ is high (i.e., $A_2=1$) indicative of a bar code present in the scan field, then the control program progresses to determine whether the output of timer 64 at input $I_4$ has gone low, indicative of timer elapse (i.e., $t \geq T_3$). In this event, the control program resets output $O_1$ to disable scanning means 3, photoreceiving means 4 and bar code detection means 5. If the input at $I_1$ is not low (i.e., $A_1=1$) indicative of timer 64 not yet elapsed, then the control program continues to determine whether the input at $I_2$ has gone low ($A_2=0$), indicative that a bar code symbol is no longer in the scan field. The control program will continue to repeat the above-described decision loop until either the bar code symbol disappears from the scan field or timer 64 elapses, whichever occurs first. If after timer 64 has elapsed and output $O_1$ has been reset, then the control program finally enters a last decision loop, to determine if first control activation signal $A_1$ at input $I_1$ has gone low, indicative that an object is no longer in the scan field. If it has, then the control program returns to start, as indicated in FIG. 7B. Otherwise, until input $I_1$ goes low, indicating that an object no longer remains in the scan field, the control program will continue to progress through this decision loop.

Figure 8A:
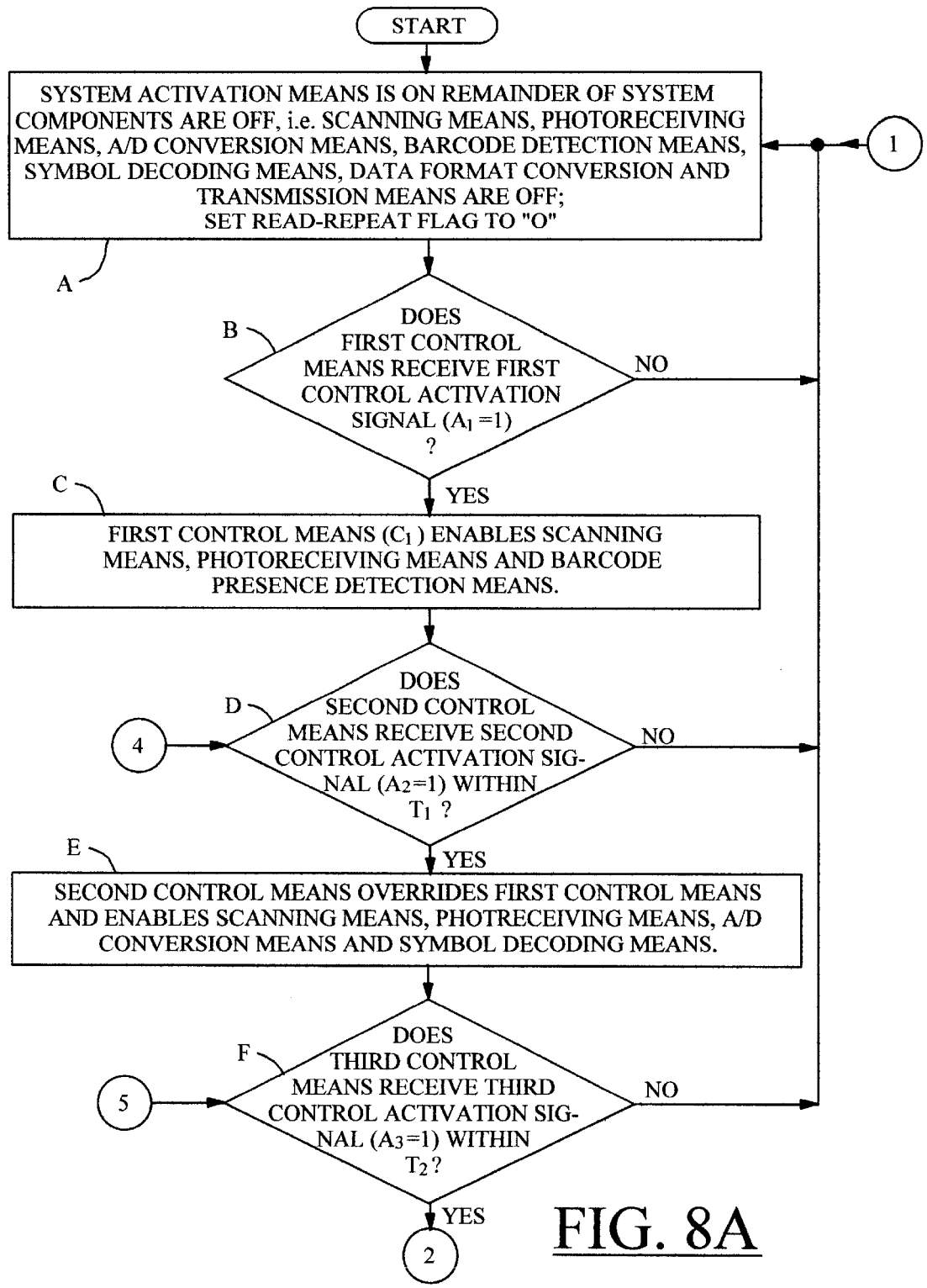
FIGS. 8A, 8B and 8C, taken together, show a high level flow chart illustrating three user-selectable courses of programmed system operation that the control system of the illustrated embodiment may undergo.
Figure 8B:
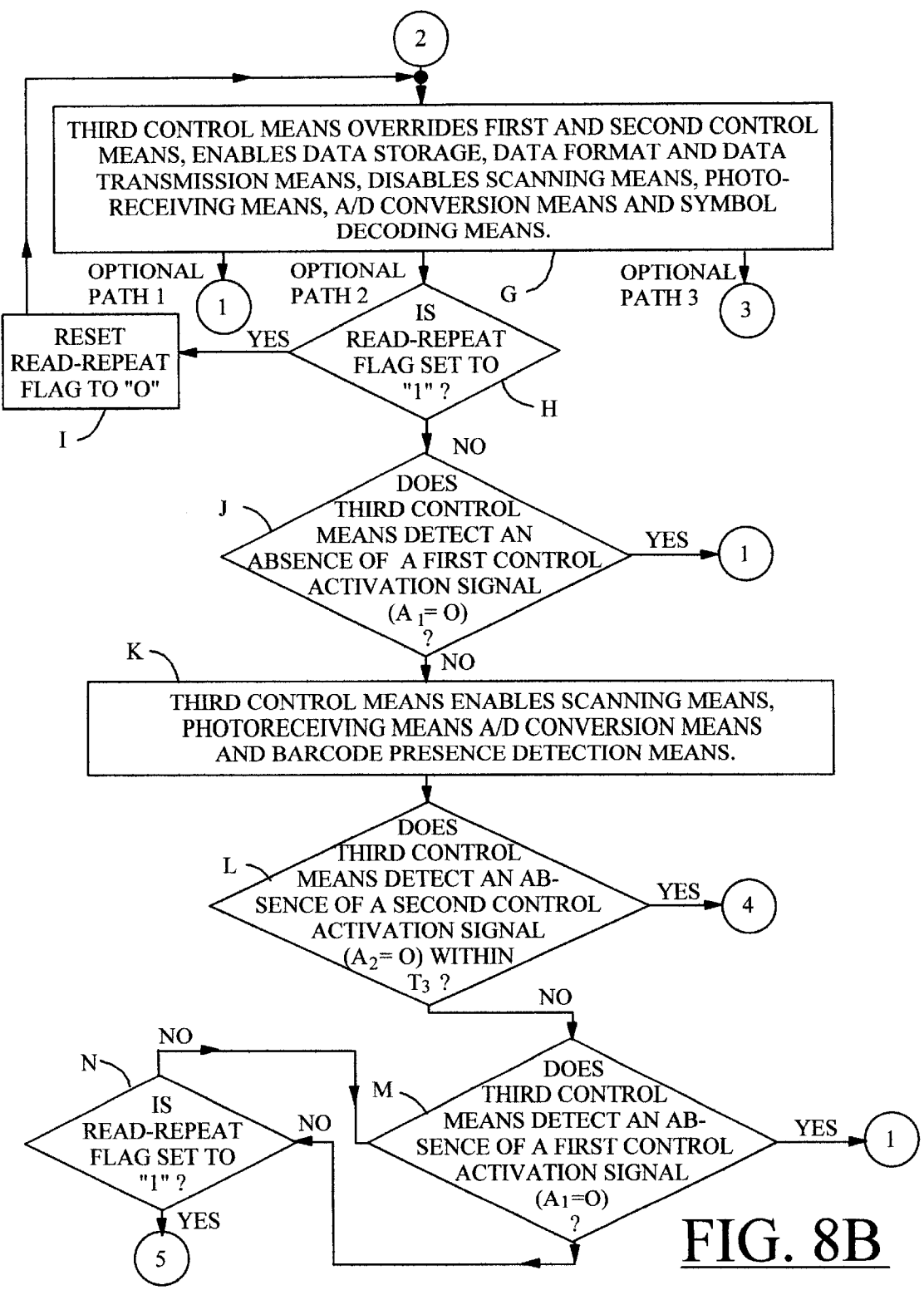
Figure 8C:
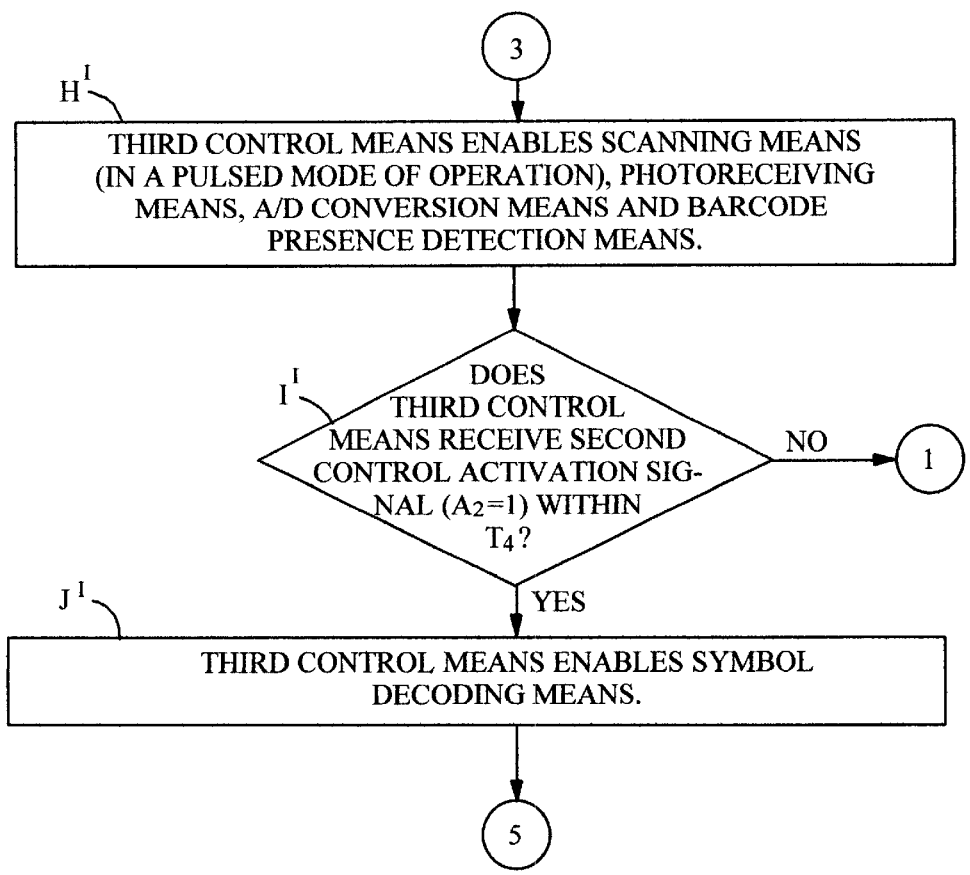

Notably, using the high level flow charts of FIGS. 8A and 8C, a control program for the third control means 13 can be implemented in a straightforward manner for System-Control Operation No. 3, illustrated in FIGS. 8B and SC.

Having described the detailed structure and internal functions of bar code symbol reading device 1, it is now proper at this juncture to describe the operation of the control system hereof, for each of the three illustrated user-selectable System-Control Operations Nos. 1, 2 and 3.

Referring to blocks A to G in FIGS. 8A and 8B, Systems-Control Operation No. 1 is illustrated. Beginning at block A, hand-holdable device 1 is turned ON, which results in system activation means 2 being enabled (i.e., ON), while the remainder of the systems components (i.e., scanning means 3, photoreceiving means 4, A/D conversion means 6, bar code detection means 5, symbol decoding means 7, data format conversion means 8, data storage means 9 and data transmission means 10), are disabled (i.e., OFF) Notably, at this control block the read-repeat flag is set to "0" within the third control means 13. At block B, the control system then determines whether first control means 11 detects the presence of first control activation signal (i.e., $A_1=1$). If not, then the control system returns to block A; otherwise, if so, then as illustrated at block C, first control means 11 directly enables scanning means 3, photoreceiving means 4 and bar code presence detection means 5.

Then at block D, second control means 12 detects the presence of second control activation signal (i.e., $A_2=1$) within first predetermined time period $T_1$. If $A_2=1$ is not present, then the control system returns to block A; and if so, then as indicated at block E, second control means 12 overrides first control means 11 and indirectly enables scanning means 3, photoreceiving means 4, A/D conversion means 6, and symbol decoding means 7.

At block F, third control means 13 then detect the presence of third control activation signal (i.e., $A_3=1$) within second predetermined time period $T_2$. If $A_3=1$ is not present within $T_2$, then the control system returns to block A; and if so, then as indicated at block G, third control means 13 overrides first and second control means 11 and 12, and indirectly enables data format conversion means 8, and data storage means 9 or data transmission means 10 until these functions are achieved, and there while disables scanning means 3, photoreceiving means 4, A/D conversion means 6 and symbol decoding means 7. Thereafter, as shown in FIGS. 8A and 8B, the control system returns to block A, where only system activation means 2 is enabled.

Referring to blocks A through N in FIGS. 8A and 8B, System-Control (override) Operation No. 2 is illustrated. This system-control operation offers the advantage of permitting the user to consecutively read two or more bar code symbols using an automatically triggered laser scanner, while avoiding multiple reading of bar code symbols due to the scanning beam dwelling on a bar code symbol for an extended period of time.

Essentially, System-Control Operation No. 2 comprises all but the last return operation of above-described System-Control Operation No. 1 and those additional operations represented by blocks G through K. After leaving block G, third control means 13 enters block H and determines whether the read-repeat flag has been set to "1", as a result of the user manually depressing read-repeat button 95 at anytime during the flow through control blocks A to G. Notably, if the read-repeat flag has been set, read-repeat LED indicator 96 will be energized by the third control means $C_3$ in order to visually remind the user that this function of the system has been selected. If the read-repeat button has been set to "1", then the system resets the read-repeat flag to "0" at block I and thereafter returns to Block G, at which time the operations described therein are re-performed. If, however, the read-repeat flag is set to "0" by failure to depress read-repeat button 95, then the system proceeds to block J.

At block J, the third control means 13 determines whether first control activation signal (i.e., $A_1$=0) is absent. If the first control activation signal $A_1$ is absent, then the control system returns to block A. If first control activation signal $A_1$ is not absent but rather present (i.e., $A_1$=1), then at block K the third control means 13 indirectly enables through overridden first control means 11, scanning means 3 and the photoreceiving means 4, and through overridden second control means 12 indirectly enables A/D conversion means 6 and bar code presence detection means 5. Thereafter, at block L, third control means 13 detects the absence of second control activation signal (i.e., $A_2$=0) within predetermined time period $T_3$. If signal $A_2$ is absent, then the control system returns to block D shown in FIG. 8A; and if signal $A_2$ is present (i.e., $A_2$=1), then third control means 13 enters a decision loop at blocks M and N. At block M, third control means 13, in its override mode, determines whether the first activation signal is absent (i.e., $A_1$=0). If $A_1$=0, then the system returns to block A. If $A_1$=1, then the third control means determines at block N whether the read-repeat flag has been set to "1". If the read-repeat flag has been set to "1" (since the time of a resetting operation at blocks A or I), then the system returns to block "F" shown in FIG. 8A, in order to read once again the previously decoded bar code symbol in the scan field. If the flag is set to "0", then the system returns to block M in order to determine whether the object has been removed from the scan field (i.e. $A_1$=0). As shown in FIG. 8B, the system remains in the decision loop M-N-M until one of these two conditions is automatically detected by the symbol.

Referring to blocks A through G and H' through I' in FIGS. 8A, 8B and 8C, System-Control Operation No. 3 is illustrated. This system-control operation offers the advantage of being able to simply read bar code symbols in inventory applications, while conserving battery power.

Essentially, System-Control Operation No. 3 comprises all but the last return operation of above-described System-Control Operation No. 1 and those additional operations represented by blocks H' through J'. After leaving block G and upon entering block H, third control means 13 enables, through overridden first control means 11, scanning means 3 in a pulsed mode of operation (by providing a pulsed enable signal $E_1'$ to laser driver 37). At block H', third control means 13 also enables through overridden first control means 11, photoreceiving means, 3, and through overridden second control means 12, enables bar code presence detection means 5, and A/D conversion means 6.

Thereafter at block I', third control means 13 detects the presence of second control activation means (i.e., $A_2$=1) within a fourth predetermined time period $T_4$, using an internal timer similar to timer ($T_3$) 64 in FIG. 7A. Preferably, the time duration of $T_3$ is selected to be about 5–10 seconds. If signal $A_2$ is not present but rather absent (i.e., $A_2$=0), then the control system returns to block A. Otherwise, if signal $A_2$ is present, then at block J' the third control means 13 enables, through overridden second control means 12, symbol decoding means 7. Thereafter, the control system returns to block F, shown in FIG. 8A.

Having described the operation of the control system of the bar code symbol reading device of present invention, it can also be helpful to understand the various states that device 1 may be in during the course of each particular system-control operation described above. In this regard, reference is made to FIG. 9 which provides a state diagram for the three system-control operations of the illustrated embodiment.

Figure 9:
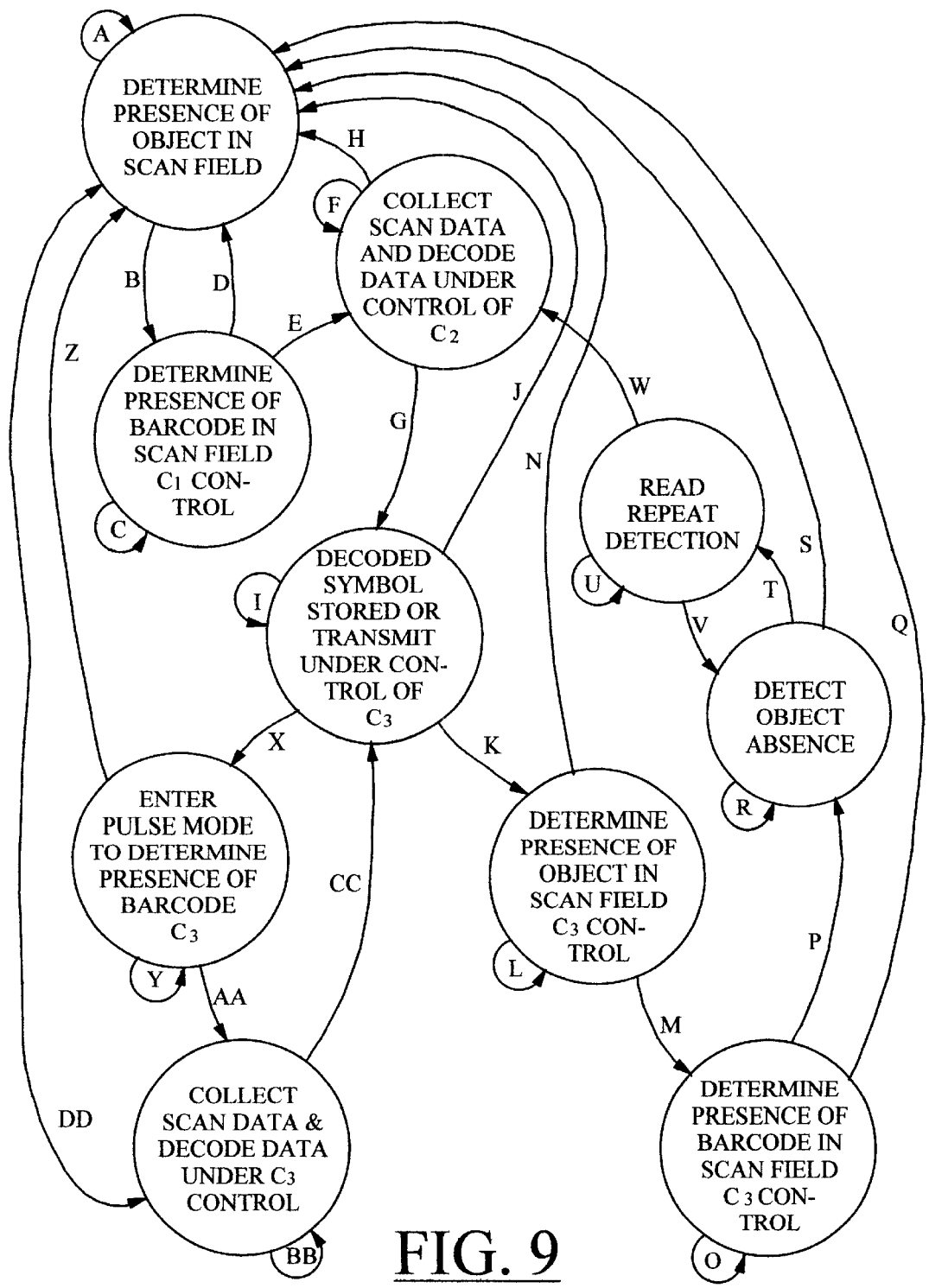
FIG. 9 is a state diagram illustrating the various states that the bar code symbol reading device of the illustrated embodiment may undergo during the course of its operation.

System-Control Operation No. 1 selected at option path 1, will be considered first. As illustrated in FIG. 9, when bar code symbol reading device is turned ON, only system activation means 2 is operative and all other system components are inoperative. This condition is indicated by state A, in which the device seeks to determine whether an object is in the scan field. Upon determination of the presence of an object in the scan field, the device will undergo state transition B, placing the device in state C.

In state C, the device seeks to determine within line $T_1$ the presence of a bar code in scan field, while under the control of first control means 11. If no bar code symbol is determined to present in the scan field with time period $T_1$ then the device will undergo state transition D, returning the device back to initial state A (indicated as "start" in FIG. 8A). On the other hand, if a bar code symbol is determined to be present in the scan field within time period $T_1$, then the device will undergo state transition E, placing the device in state F.

In state F, the device collects bar code scan data $D_1$ under the control of second control means 12, converts scan data $D_1$ into scan data $D_2$ and decode processes this scan data, scan-line by scan-line, in an attempt to decode a valid bar code symbol within time period $T_2$. If a bar code symbol is not decoded within time period $T_2$, then the device undergoes state transition H, returning the device to initial state A. If on the other hand a valid bar code symbol is decoded within time period $T_2$, symbol character data $D_3$ produced, and then the device undergoes state transition G, placing the device on "control-override" state I.

In state I, device 1 while under control of the third control means, converts the data format of symbol character data $D_3$ into either data $D_4$ or $D_5$ depending on whether the converted symbol character data is to be stored or transmitted to host device 60. Also in state I, the device either stores data $D_5$ in storage means 9, or transmits data $D_5$ to host device 60 via data transmission means 10 and data transmission cable 61, shown in FIG. 2. After completion of the above functions, the device undergoes state transition J (due to user-selection of System-Control Operation No. 1), returning the device to initial state A, completing a full path through System-Control Operation No. 1.

System-Control Operation No. 2, selected at option path 2, will now be considered. From control override state I, the device undergoes transition K, due to user-selection of System-Control Operation No. 2, placing the device in control-override state L. In state L, the device determines the presence of an object in the scan field, while under the override control of third control means 13. Upon determination of the presence of an object in the scan field device 1 undergoes state transition M, placing it into state O. On the other hand, if no object is determined to be within the scan field, then the device returns to initial state A.

In state O, the device seeks to determine the presence of a bar code symbol within the scan field, while the device is under the control of third control means 13. If the device determines that no bar code symbol is within the scan field, then the device undergoes state transition Q, returning the device to initial state A. If on the other hand the device determines that a bar code symbol lies within the scan field, indicative of the scanning beam dwelling on a bar code symbol for an extended period of time, then the device undergoes state transition P, placing device 1 in control-override state R.

In state R, the device continues scanning, photoreceiving and bar code presence detection functions under the control of third control means 13, and checks to determine the presence of the object in the scan field. If the presence of the object is not detected within the scan field, then the device undergoes state transition S, returning the device to initial state A and enabling the reading of another bar code symbol. If, however, the presence of the object is detected ($A_1=1$), then the system undergoes state transition T, advancing the device to state U, where it determines whether the read-repeat flag has been selected to "1". If this flag value is not detected, the device undergoes state transition V, returning the device to state R. However, if the read-repeat flag has been set to "1", then the device undergoes state transition W, returning the device to state F, where scan data is collected and decoded under the control of the third control means $C_3$ in order to read once again the previously decoded bar code symbol. Notably, state transitions from A-B-C-E-F-G-K-L-M-O-P-R-T-U-W-F can occur i indefinitely with the device of the present invention so long as the user depresses button 95.

Lastly, System-Control Operation No. 3, selected at option path 3, is now considered. From control-override state I, the device undergoes state transition X, due to user-selection of System-Control Operation No. 3, placing the device in control-override state Y. In state Y, scanning means 3 is enabled in a pulsed-mode of operation under control of third control 13, photoreceiving means 4 and bar code presence detection means 5; are also enabled under third control means 13, and there while the device seeks to detect the presence of a bar code symbol in the scan field within fourth predetermined time period $T_4$. If a bar code symbol is not detected within time period $T_4$, then the device undergoes state transition Z and returns to initial state A under override control of third control means 13. If on the other hand, the presence of a bar code symbol is detected within time period $T_4$, then the device undergoes state transition AA, placing the device in control-override state BB.

In state BB, bar code scan data is collected scan-line by scan-line, and each scan line of data is decode processed in order to decode a valid bar code symbol. If a bar code symbol is decoded within time period $T_2$, then symbol character data $D_3$ is produced and the device undergoes state transition CC, placing device in control-override state I under the control of third control means 13. There, symbol character data $D_3$ is format converted, and stored or transmitted as hereinbefore described. Thereafter, device 1 undergoes state transition X, returning the device to state Y under control of the third control means. If, however, a bar code symbol is not decoded within time period $T_2$ when the device is in state BB, then the device undergoes state transition DD, returning the device to state A while under the control of third contact means 13.

Figure 10:
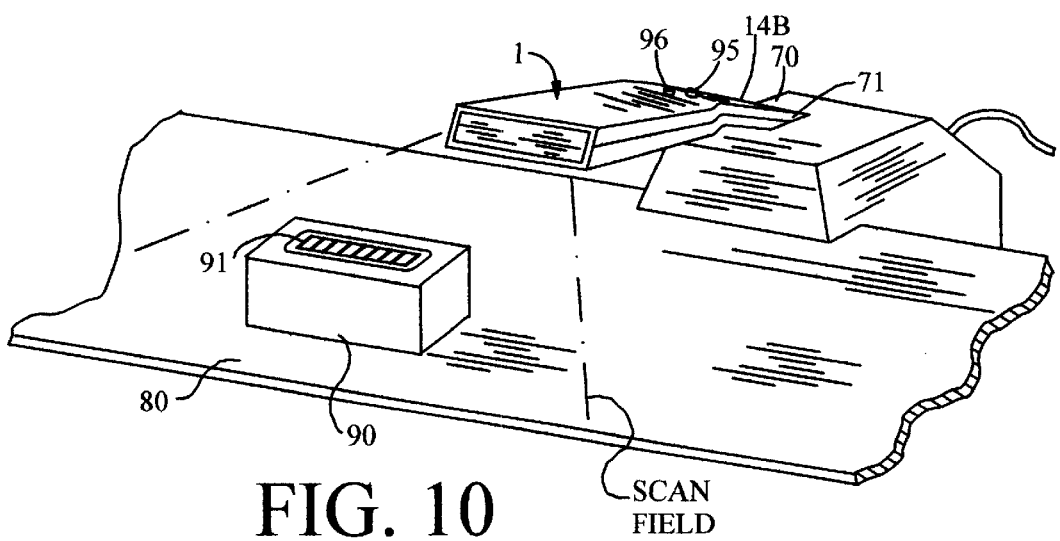
FIG. 10 is a perspective view of a surface-mountable support stand adapted for receipt of the hand-held bar code symbol reading device of the present invention and facilitating table top use thereof.

The automatic hand-holdable bar code symbol reading device of the present invention may also be used as stationary bar code symbol reader, as shown in FIG. 10. There, a support stand 70 is shown having a receptacle 71 for receipt of housing handle portion 14B using support stand 70, device 1 can be mounted so as to position the scan field over a counter top 80 where goods 90 bearing bar codes 91 may be passed for reading.

While device 1 of the present invention has been provided with three user-selectable system-control (i.e., intelligence) operations, additional system-control operations may be provided to the control system hereof, in a manner as discussed hereinabove.

While the particular embodiment shown and described above has proven to be useful in many application in the code symbol reading art, further modification of the present invention herein disclosed will occur to persons skilled in the art to which the present invention pertains. All such modifications are deemed to be within the scope and spirit of the present invention defined by the appended claims to invention.

What is claimed is:

1. An automatic bar code symbol system having a selectable mode of operation in which a bar code symbol can be selectively read one or more times, said system comprising:

a hand-supportable housing having a light transmission aperture through which visible light can exit from and enter into said hand-supportable housing;

laser beam producing means, disposed in said hand-supportable housing, for producing a visible laser beam within said hand-supportable housing;

laser beam scanning means, disposed in said hand-supportable housing, for repeatedly scanning said visible laser beam across a scan field defined external to said hand-supportable housing and across a bar code symbol supported on an object located in at least a portion of said scan field;

laser light detecting means, disposed in said hand-supportable housing, for detecting the intensity of visible laser light reflected off said bar code symbol and passing through said light transmission aperture as said visible laser beam is repeatedly scanned across said bar code symbol present in said scan field, and for automatically producing scan data indicative of said detected intensity;

a manually actuatable switch for generating a read-repeat signal representative of a request by the user of said systems, to detect and decode once again a previously detected and decoded bar code symbol;

scan data processing means for processing produced scan data in order to detect and decode said bar code symbol when said bar code symbol is present in said scan field and automatically produce symbol character data in a form representative of said decoded bar code symbol and suitable for transmission to a symbol character data storage means, said scan data processing means automatically detecting the generation of said signal, prior to said scan data processing means automatically processing produced scan data so as to detect and decode said decoded bar code symbol once again, and thereafter produce once again symbol character data in a form representative of said decoded bar code symbol; and control means for automatically controlling the operation of said laser beam producing means and said scan data processing means so that said bar code symbol is detected and decoded as said visible laser beam is repeatedly scanned across said bar code symbol present in said scan field, and after said signal processing means detects the generation of said signal, said scan data processing means automatically processes produced scan data in order to detect and decode said decoded bar code symbol once again, and thereafter automatically produces once again said symbol character representative of said decoded bar code symbol, and suitable for transmission once again to said symbol character data storage means.

2. The system of claim 1, wherein said laser beam producing means comprises a laser diode.

3. The system of claim 1, wherein said bar code symbol has first and second envelope borders, and wherein said scan data processing means detects the presence of said bar code symbol in said scan field by processing produced scan data so as to detect the first and second envelope borders of said bar code symbol.

4. The system of claim 1, wherein said hand-supportable housing comprises a head portion and a handle portion, and wherein said laser beam producing means, said laser beam scanning means, and said laser light detecting means are disposed in said head portion.

5. The system of claim 1, wherein said scan data processing means, and said control means are disposed within said hand-supportable housing.

6. The system of claim 5, which further comprises a data output port for transmitting said symbol character data to said symbol character data storage means disposed external to said hand-supportable housing.

7. The system of claim 6, which further comprises a flexible connector cable physically associated with said data output port, for transmitting said bar code symbol data to said symbol character data storage means.

8. An automatic bar code symbol system having a selectable mode of operation in which a bar code symbol can be selectively read one or more times, said system comprising:

a hand-supportable housing having a light transmission aperture through which visible light can exit from and enter into said hand-supportable housing;

laser beam producing means, disposed in said hand-supportable housing, for producing a visible laser beam within said hand-supportable housing;

laser beam scanning means, disposed in said hand-supportable housing, for repeatedly scanning said visible laser beam across a scan field defined external to said hand-supportable housing and across a bar code symbol supported on an object located in at least a portion of said scan field;

laser light detecting means, disposed in said hand-supportable housing, for detecting the intensity of visible laser light reflected off said bar code symbol and passing through said light transmission aperture as said visible laser beam is repeatedly scanned across said bar code symbol present in said scan field, and for automatically producing scan data indicative of said detected intensity;

a manually actuatable switch for generating a signal representative of a request to produce once again symbol character data representative of a previously detected and decoded bar code symbol by the user of said system;

scan data processing means for processing produced scan data in order to detect and decode said bar code symbol when said bar code symbol is present in said scan field and automatically produce symbol character data in a form representative of said decoded bar code symbol and suitable for transmission to a symbol character data storage means, said scan data processing means automatically detecting the generation of said signal, prior to said scan data processing means automatically producing once again, and thereafter produce once again symbol character data in a form representative of said decoded bar code symbol; and control means for automatically controlling the operation of said laser beam producing means and said scan data processing means so that said bar code symbol is detected and decoded as said visible laser beam is repeatedly scanned across said bar code symbol present in said scan field, and after said scan data processing means detects the generation of said signal, said scan data processing means automatically produces once again said symbol character representative of said decoded bar code symbol and suitable for transmission once again to said symbol character data storage means.

9. The system of claim 1, wherein said laser beam producing means comprises a laser diode.

10. The system of claim 1, wherein said bar code symbol has first and second envelope borders, and wherein said scan data processing means detects the presence of said bar code symbol in said scan field by processing produced scan data so as to detect the first and second envelope borders of said bar code symbol.

11. The system of claim 1, wherein said hand-supportable housing comprises a head portion and a handle portion, and wherein said laser beam producing means, said laser beam scanning means, and said laser light detecting means are disposed in said head portion.

12. The system of claim 1, wherein said scan data processing means, and said control means are disposed within said hand-supportable housing.

13. The system of claim 5, which further comprises a data output port for transmitting said symbol character data to said symbol character data storage means disposed external to said hand-supportable housing.

14. The system of claim 6, which further comprises a flexible connector cable physically associated with said data output port, for transmitting said bar code symbol data to said symbol character data storage means.

15. A method of selectively reading a bar code symbol one or more times using an automatic hand-supportable unit, comprising the sequence of steps:

(a) manually supporting said automatic hand-supportable unit adjacent an object supporting a bar code symbol so that said object is located within at least a portion of a scan field defined external to said automatic hand-supportable unit, and said automatic hand-supportable unit is disposed in a substantially non-contacting relationship with said object;

(b) automatically producing a visible laser beam from a laser beam producing source disposed in said automatic hand-supportable unit, and repeatedly scanning said visible laser beam through a light transmission aperture in said automatic hand-supportable unit and across said bar code symbol while said bar code symbol is present in said scan field;

(c) automatically detecting at said automatic hand-supportable unit, the intensity of visible laser light reflected off said bar code symbol, and automatically producing scan data indicative of said detected intensity of visible laser light reflected off said bar code symbol;

(d) automatically processing scan data produced in step (c) in order to detect and decode said bar code symbol present in said scan field, and upon detecting and decoding said bar code symbol, automatically producing symbol character data in a form representative of said decoded bar code symbol and suitable for transmission to a symbol character data storage means operably associated with said hand-supportable unit;

(e) manually actuating a switch operably associated with said hand-supportable housing, in order to generate a signal indicative of a request by the user, for said hand-supportable unit to automatically read once again the bar code symbol which has decoded during step (d);

(f) automatically producing said visible laser beam from said laser beam producing source, and repeatedly scanning said visible laser beam through said light transmission aperture and across said bar code symbol present once again in said scan field;

(g) automatically detecting at said automatic hand-supportable unit, the intensity of visible laser light reflected off said decoded bar code symbol, and automatically producing scan data indicative of said detected intensity of visible laser light of the decoded bar code symbol;

(h) in response to the generation of said signal, automatically processing scan data produced in step (g) in order to detect and decode once again said decoded bar code symbol, and upon detecting and decoding said decoded bar code symbol, automatically producing once again symbol character data in a form representative of said decoded bar code symbol and suitable for transmission to said symbol character data storage means.

16. The method of claim 15, where in steps (d) and (h), said scan data is processed by a scan data processor disposed in said automatic hand-supportable unit.

17. The method of claim 15, where in steps (b) and (h), said visible laser beam is produced by a laser diode disposed in said automatic hand-supportable unit.

18. The method of claim 15, wherein said bar code symbol has first and second envelope borders, and where in step (d) the presence of said bar code symbol in said scan field is detected by processing produced scan data so as to detect the first and second envelope borders of said bar code symbol.

19. The method of claim 15, wherein said automatic hand-supportable unit comprises a housing having a head portion and a handle portion.

20. A method of selectively reading a bar code symbol one or more times using an automatic hand-supportable unit, comprising the sequence of steps:

(a) manually supporting said automatic hand-supportable unit adjacent an object supporting a bar code symbol so that said object is located within at least a portion of a scan field defined external to said automatic hand-supportable unit, and said automatic hand-supportable unit is disposed in a substantially non-contacting relationship with said object;

(b) automatically producing a visible laser beam from a laser beam producing source disposed in said automatic hand-supportable unit, and repeatedly scanning said visible laser beam through a light transmission aperture in said automatic hand-supportable unit and across said bar code symbol while said bar code symbol is present in said scan field;

(c) automatically detecting at said automatic hand-supportable unit, the intensity of visible laser light reflected off said bar code symbol, and automatically producing scan data indicative of said detected intensity of visible laser light reflected off said bar code symbol;

(d) automatically processing scan data produced in step (c) in order to detect and decode said bar code symbol present in said scan field, and upon detecting and decoding said bar code symbol, automatically producing symbol character data in a form representative of said decoded bar code symbol and suitable for transmission to a symbol character data storage means operably associated with said hand-supportable unit;

(e) manually actuating a switch operably associated with said hand-supportable housing, in order to generate a signal indicative of a request by the user, for said hand-supportable unit to automatically produce once again symbol character data which was produced during step (d);

(f) in response to the generation of said read-repeat signal produced during step (d), automatically producing once again symbol character data in a form representative of said decoded bar code symbol and suitable for transmission to said symbol character data storage means.

21. The method of claim 15, where in step (d), said scan data is processed by a scan data processor disposed in said automatic hand-supportable unit.

22. The method of claim 15, where in step (b), said visible laser beam is produced by a laser diode disposed in said automatic hand-supportable unit.

23. The method of claim 15, wherein said bar code symbol has first and second envelope borders, and where in step (d) the presence of said bar code symbol in said scan field is detected by processing produced scan data so as to detect the first and second envelope borders of said bar code symbol.

24. The method of claim 15, wherein said automatic hand-supportable unit comprises a housing having a head portion and a handle portion.

25. An automatic bar code symbol reading system, comprising:

a hand-supportable housing having a light transmission aperture through which visible light can exit and enter said hand-supportable housing;

object detection means in said hand-supportable housing, for transmitting a pulsed infra-red light signal from adjacent said aperture, outwardly into at least a portion of a scan field defined external to said hand-supportable housing, and for automatically generating a first signal in response to the detection of said transmitted infra-red light signal reflected off an object located in said scan field;

scanning means in said hand-supportable housing, for producing a visible light beam within said hand-supportable housing and for directing said visible light beam through said light transmission aperture, and repeatedly scanning said visible light beam across said scan field and a bar code symbol on said detected object;

light detection means in said hand-supportable housing, for detecting the intensity of light reflected off said bar code symbol and passing through said light transmission aperture, and automatically producing scan data indicative of the detected light intensity;

first activatable processing means for processing produced scan data so as to detect said bar code symbol on said detected object, and automatically generating a second signal in response to the detection of said bar code symbol on said detected object;

second activatable processing means for processing produced scan data so as to decode said detected bar code symbol, and automatically producing symbol character data representative of said decoded symbol in response to the decoding of said detected bar code symbol;

manually actuatable means for generating a third signal representative of a request by the user of said automatic bar code symbol reading system, to decode once again said bar code symbol; and system control means for controlling the operation of said automatic bar code symbol reading system using first, second and third signals, said system control means including first control means for controlling the operation of said object detection means, second control means for automatically activating said scanning means, said light detection means and said first activatable processing means for up to a first predetermined time period in response to the generation of said first signal, and third control means for automatically activating said scanning means, said light detection means and said second activatable processing means for up to a second predetermined time period in response to the generation of said second signal.

26. The automatic bar code symbol reading system of claim 25, wherein said visible light beam is a visible laser beam, and wherein said scanning means comprises a laser diode disposed in said hand-supportable housing for producing said visible laser beam, and an electrically driven scanning element for repeatedly scanning said laser beam across said scan field and said bar code symbol on said detected object.

27. The automatic bar code symbol reading system of claim 25, wherein second control means further comprises means for automatically deactivating said scanning means, said light detection means and said first activatable processing means in response to said first activatable processing means failing to generate said second signal within said first predetermined time period.

28. The automatic bar code symbol reading system of claim 27, wherein said third control means further comprises means for automatically deactivating said scanning means, said light detection means and said second activatable processing means in response to said second activatable processing means failing to decode said detected bar code symbol on said detected object within said second predetermined time period.

29. The automatic bar code symbol reading system of claim 28, wherein said third control means overrides the control operation of said second control means in response to said first processing means generating said second signal.

30. The automatic bar code symbol reading system of claim 29, wherein said third activatable processing means comprises a programmed microprocessor.

31. The automatic bar code symbol reading system of claim 30, wherein said first control means and said second control means comprise first and second control circuits, respectively.

32. The automatic bar code symbol reading system of claim 25, wherein said hand-supportable housing comprises a head portion and handle portion, and wherein said object detection means and said scanning means are disposed in said head portion.

33. An automatic bar code symbol reading system, comprising:

a hand-supportable housing having a light transmission aperture through which visible light can exit and enter said hand-supportable housing;

object detection means in said hand-supportable housing, for automatically detecting an object located in at least in a portion of a scan field defined external to said hand-supportable housing, said object detection means including means for receiving energy from said scan field and means for automatically generating a first signal in response to the detection of energy reflected off an object located in said scan field;

scan data producing means in said hand-supportable housing for producing scan data from said detected object located in said scan field, said scan data producing means including laser beam generating means for generating a visible laser beam within said hand-supportable housing, laser beam scanning means for projecting said visible laser beam through said light transmission aperture and for repeatedly scanning said visible laser beam across said scan field and a bar code symbol on said detected object, and laser light detecting means for detecting the intensity of laser light reflected off said bar code symbol and passing through said light transmission aperture, and for automatically producing scan data indicative of said detected intensity;

first activatable processing means for processing produced scan data so as to detect said bar code symbol on said detected object, and automatically generating a second signal in response to the detection of said bar code symbol;

second activatable processing means for processing produced scan data so as to decode said detected bar code symbol, and automatically producing symbol character data representative of said decoded bar code symbol in response to the decoding of said detected bar code symbol;

manually-actuatable means for generating a third signal representative of a request by the user of said automatic bar code symbol reading system, to produce once again symbol character data representative of said detected and decoded bar code symbol; and system control means for controlling the operation of said automatic bar code symbol reading system using said first, second and third signals.

34. An automatic bar code symbol reading system, comprising:

a hand-supportable housing having a light transmission aperture through which visible light can exit and enter said hand-supportable housing;

object detection means in said hand-supportable housing, for automatically detecting an object located in at least in a portion of a scan field defined external to said hand-supportable housing, said object detection means including means for receiving energy from said scan field and means for automatically generating a first signal in response to the detection of energy reflected off an object located in said scan field;

scan data producing means in said hand-supportable housing for producing scan data from said detected object located in said scan field, said scan data producing means including laser beam generating means for generating a visible laser beam within said hand-supportable housing, laser beam scanning means for projecting said visible laser beam through said light transmission aperture and for repeatedly scanning said visible laser beam across said scan field and a bar code symbol on said detected object, and laser light detecting means for detecting the intensity of laser light reflected off said bar code symbol and passing through said light transmission aperture, and for automatically producing scan data indicative of said detected intensity;

first activatable processing means for processing produced scan data so as to detect said bar code symbol on said detected object, and automatically generating a second signal in response to the detection of said bar code symbol;

second activatable processing means for processing produced scan data so as to decode said detected bar code symbol, and automatically producing symbol character data representative of said decoded bar code symbol in response to the decoding of said detected bar code symbol;

manually-actuatable means for generating a third signal representative of a request by the user of said automatic bar code symbol reading system, to decode once again said detected and decoded bar code symbol; and system control means for controlling the operation of said automatic bar code symbol reading system using said first, second and third signals.

35. An automatic bar code symbol reading system, comprising:

a hand-supportable housing having a light transmission aperture through which visible light can exit and enter said hand-supportable housing;

an object detection means in said hand-supportable housing automatically generating an activation signal in response to the detection of an object located within at least a portion of a scan field defined external to said hand-supportable housing;

a laser beam source in said hand-supportable housing for producing a visible laser beam within said hand-supportable housing;

an activatable scanning mechanism in said hand-supportable housing for repeatedly scanning, when activated, said visible laser beam through said light transmission aperture, and across said scan field and a bar code symbol on said detected object;

light detection means in said hand-supportable housing, for detecting the intensity of laser light reflected off said bar code symbol as said visible laser beam is repeatedly scanned across said scan field and said bar code symbol, and for automatically producing scan data indicative of the detected intensity of said reflected laser light;

scan data processing means in said hand-supportable housing, for processing produced scan data so as to detect and decode said bar code symbol on said detected object, and upon, detecting and decoding said bar code symbol on said detected object, automatically producing symbol character data representative of said decoded bar code symbol;

manually actuatable means for generating a read-repeat signal representative of a request by the user of said automatically bar code symbol reading system to produce once again symbol character data representative of said decoded bar code symbol; and system control means for controlling the operation of said automatic bar code reading system, said system control means including first control means for controlling the operation of said object detection means, second control means for automatically activating said activatable scanning mechanism for up to a first predetermined time period in response to the generation of said activation signal, and third control means for automatically continuing the activation of said activatable scanning mechanism for up to a second predetermined time period in response to said scan data processing means detecting and decoding said bar code symbol on said detected object within said first predetermined time period, thereby permitting the detection and decoding of another bar code symbol in said scan field.

36. An automatic bar code symbol reading system, comprising:

a hand-supportable housing having a light transmission aperture through which visible light can exit and enter said hand-supportable housing;

an object detection means in said hand-supportable housing automatically generating an activation signal in response to the detection of an object located within at least a portion of a scan field defined external to said hand-supportable housing;

a laser beam source in said hand-supportable housing for producing a visible laser beam within said hand-supportable housing;

an activatable scanning mechanism in said hand-supportable housing for repeatedly scanning, when activated, said visible laser beam through said light transmission aperture, and across said scan field and a bar code symbol on said detected object;

light detection means in said hand-supportable housing, for detecting the intensity of laser light reflected off said bar code symbol as said visible laser beam is repeatedly scanned across said scan field and said bar code symbol, and for automatically producing scan data indicative of the detected intensity of said reflected laser light;

scan data processing means in said hand-supportable housing, for processing produced scan data so as to detect and decode said bar code symbol on said detected object, and upon detecting and decoding said bar code symbol on said detected object, automatically producing symbol character data representative of said decoded bar code symbol;

manually actuatable means for generating a read-repeat signal representative of a request by the user of said automatically bar code symbol reading system to detect and decode once again said decoded bar code symbol; and system control means for controlling the operation of said automatic bar code reading system, said system control means including first control means for controlling the operation of said object detection means, second control means for automatically activating said activatable scanning mechanism for up to a first predetermined time period in response to the generation of said activation signal, and third control means for automatically continuing the activation of said activatable scanning mechanism for up to a second predetermined time period in response to said scan data processing means detecting and decoding said bar code symbol on said detected object within said first predetermined time period, thereby permitting the detection and decoding of another bar code symbol in said scan field.

37. An automatic bar code symbol reading system, comprising:

a hand-supportable housing having a light transmission aperture through which visible light can exit and enter said hand-supportable housing;

an object detection means in said hand-supportable housing automatically generating an activation signal in response to the detection of an object located within at least a portion of a scan field defined external to said hand-supportable housing;

a laser beam source in said hand-supportable housing for producing a visible laser beam within said hand-supportable housing;

an activatable scanning mechanism in said hand-supportable housing for repeatedly scanning, when activated, said visible laser beam through said light transmission aperture, and across said scan field and a bar code symbol on said detected object;

light detection means in said hand-supportable housing, for detecting the intensity of laser light reflected off said bar code symbol as said visible laser beam is repeatedly scanned across said scan field and said bar code symbol, and for automatically producing scan data indicative of the detected intensity of said reflected laser light;

activatable scan data processing means in said hand-supportable housing for processing, when activated, produced scan data so as to detect and decode said bar code symbol on said detected object, and upon detecting and decoding said bar code symbol on said detected object, automatically producing symbol character data representative of said decoded bar code symbol;

manually actuatable means for generating a read-repeat signal representative of a request by the user of said automatically bar code symbol reading system, to produce once again symbol character data representative of said decoded bar code symbol; and system control means for automatically controlling the operation of said activatable scanning mechanism and said activatable scan data processing means using said activation signal and said read-repeat signal, so as to permit the sequential detection and decoding of two or more bar code symbols in said scan field.

38. An automatic bar code symbol reading system, comprising:

a hand-supportable housing having a light transmission aperture through which visible light can exit and enter said hand-supportable housing;

an object detection means in said hand-supportable housing automatically generating an activation signal in response to the detection of an object located within at least a portion of a scan field defined external to said hand-supportable housing;

a laser beam source in said hand-supportable housing for producing a visible laser beam within said hand-supportable housing;

an activatable scanning mechanism in said hand-supportable housing for repeatedly scanning, when activated, said visible laser beam through said light transmission aperture, and across said scan field and a bar code symbol on said detected object;

light detection means in said hand-supportable housing, for detecting the intensity of laser light reflected off said bar code symbol as said visible laser beam is repeatedly scanned across said scan field and said bar code symbol, and for automatically producing scan data indicative of the detected intensity of said reflected laser light;

activatable scan data processing means in said hand-supportable housing for processing, when activated, produced scan data so as to detect and decode said bar code symbol on said detected object, and upon detecting and decoding said bar code symbol on said detected object, automatically producing symbol character data representative of said decoded bar code symbol;

manually actuatable means for generating a read-repeat signal representative of a request by the user of said automatically bar code symbol reading system to detect and decode once again symbol character data representative of said decoded bar code symbol; and system control means for automatically controlling the operation of said activatable scanning mechanism and said activatable scan data processing means using said activation signal and said read-repeat signal, so as to permit the sequential detection and decoding of two or more bar code symbols in said scan field.

39. An automatic bar code symbol reading system comprising:

a hand-supportable housing having a light transmission aperture through which visible light can exit and enter said hand-supportable housing;

an object detection circuit in said hand-supportable unit, for automatically generating a first signal in response to the detection of an object located in a scan field defined external to said hand-supportable housing;

a laser beam source in said hand-supportable housing for producing a visible laser beam;

an activatable scanning mechanism is said hand-supportable housing for repeatedly scanning, when activated, said visible laser beam through said light transmission aperture, and across said scan field and a first bar code symbol on said detected object;

light detection means in said hand-supportable housing, for detecting the intensity of laser light reflected off said first bar code symbol as said visible light beam is repeatedly scanned across said scan field and said first bar code symbol on said detected object, and for automatically producing scan data indicative of the detected intensity of said reflected laser light;

scan data processing means for processing produced scan data in order to detect and decode said first bar code symbol on said detected object, and upon detecting and decoding said first bar code symbol character data representative of said decoded bar code symbol;

means for generating a second signal representative of a request by the user of said automatically bar code symbol reading system, to produce once again symbol character data representative of said decoded bar code symbol; and control means for controlling the operation of said automatic bar code symbol reading system using said first and second signals.

40. An automatic bar code symbol reading system comprising:

a hand-supportable housing having a light transmission aperture through which visible light can exit and enter said hand-supportable housing;

an object detection circuit in said hand-supportable unit, for automatically generating a first signal in response to the detection of an object located in a scan field defined external to said hand-supportable housing;

a laser beam source in said hand-supportable housing for producing a visible laser beam;

an activatable scanning mechanism is said hand-supportable housing for repeatedly scanning, when activated, said visible laser beam through said light transmission aperture, and across said scan field and a first bar code symbol on said detected object;

light detection means in said hand-supportable housing, for detecting the intensity of laser light reflected off said first bar code symbol as said visible light beam is repeatedly scanned across said scan field and said first bar code symbol on said detected object, and for automatically producing scan data indicative of the detected intensity of said reflected laser light;

scan data processing means for processing produced scan data in order to detect and decode said first bar code symbol on said detected object, and upon detecting and decoding said first bar code symbol character data representative of said decoded bar code symbol;

means for generating a second signal representative of a request by the user of said automatically bar code symbol reading system, to detect and decode once again said decoded bar code symbol; and control means for controlling the operation of said automatic bar code symbol reading system using said first and second signals.

* * * * *